US009525923B2

(12) United States Patent
Proctor, Jr.

(10) Patent No.: US 9,525,923 B2
(45) Date of Patent: Dec. 20, 2016

(54) MULTI-DETECTION OF HEARTBEAT TO REDUCE ERROR PROBABILITY

(71) Applicant: Intel Corporation, Santa Clara, CA (US)

(72) Inventor: James A. Proctor, Jr., Indialantic, FL (US)

(73) Assignee: Intel Corporation, Santa Clara, CA (US)

( * ) Notice: Subject to any disclaimer, the term of this patent is extended or adjusted under 35 U.S.C. 154(b) by 97 days.

(21) Appl. No.: 14/325,756

(22) Filed: Jul. 8, 2014

(65) Prior Publication Data

US 2014/0321441 A1    Oct. 30, 2014

Related U.S. Application Data

(63) Continuation of application No. 12/165,422, filed on Jun. 30, 2008, now Pat. No. 9,042,400, which is a
(Continued)

(51) Int. Cl.
*H04L 12/26* (2006.01)
*H04Q 11/04* (2006.01)
(Continued)

(52) U.S. Cl.
CPC ........... *H04Q 11/04* (2013.01); *H04J 13/0077* (2013.01); *H04J 13/16* (2013.01); *H04L 1/0007* (2013.01);
(Continued)

(58) Field of Classification Search
CPC .. H04L 47/10; H04L 2012/5631; H04L 47/15; H04L 47/2441; H04L 47/70; H04L 47/35; H04L 47/30; H04L 47/32; H04L 47/11; H04L 47/12; H04L 1/0007; H04L 1/1809; H04L 7/06; H04L 25/14; H04L 27/2601; H04Q 11/04; H04Q 11/0428; H04B 1/7075; H04J 13/0077; H04J 13/16
(Continued)

(56) References Cited

U.S. PATENT DOCUMENTS 3,560,978 A    2/1971    Himmel et al.
3,725,938 A    4/1973    Black et al.
(Continued)

FOREIGN PATENT DOCUMENTS

DE    19907085    4/2000
EP    2812575     9/1979
(Continued)

OTHER PUBLICATIONS

Notice of Allowance for U.S. Appl. No. 12/788,716, mailed Sep. 10, 2014, 15 pages.
(Continued)

*Primary Examiner* — Brenda H Pham
(74) *Attorney, Agent, or Firm* — Blakely, Sokoloff, Taylor & Zafman LLP

(57) ABSTRACT

A communications system improves performance of detecting a signal having an indication of a request to change communications states by making at least two positive identifications of the request in a given time frame. The system may further improve performance by applying a difference in power levels for a non-request state (i.e., steady state or 'control hold' state) versus a request state (i.e., 'request to change' state). In one particular application, a base station determines a request to change communications states with a reasonably high probability of detection and a reasonably low probability of false detection. The system has a reduced number of erroneous communications states, such as erroneous traffic channel allocations. The detection technique is compatible with 1xEV-DV systems and
(Continued)

I-CDMA systems, but general enough to support systems employing various other communications protocols used in wired and wireless communications systems.

19 Claims, 7 Drawing Sheets

Related U.S. Application Data continuation of application No. 10/171,378, filed on Jun. 12, 2002, now Pat. No. 7,394,791, and a continuation-in-part of application No. 09/997,621, filed on Nov. 29, 2001, now Pat. No. 6,678,260.

(60) Provisional application No. 60/378,903, filed on May 7, 2002, provisional application No. 60/297,987, filed on Jun. 13, 2001, provisional application No. 60/180,598, filed on Feb. 7, 2000.

(51) Int. Cl.
| | | |
|---|---|---|
| *H04J 13/00* | (2011.01) | |
| *H04J 13/16* | (2011.01) | |
| *H04L 1/00* | (2006.01) | |
| *H04L 1/18* | (2006.01) | |
| *H04L 7/06* | (2006.01) | |
| *H04L 25/14* | (2006.01) | |
| *H04W 28/18* | (2009.01) | |
| *H04W 74/00* | (2009.01) | |
| *H04W 72/04* | (2009.01) | |
| *H04L 5/00* | (2006.01) | |
| *H04B 1/7075* | (2011.01) | |
| *H04L 27/26* | (2006.01) | |
| *H04W 28/04* | (2009.01) | |
| *H04W 74/04* | (2009.01) | |
| *H04W 74/08* | (2009.01) | |
| *H04W 84/14* | (2009.01) | |

(52) U.S. Cl.
CPC ......... *H04L 1/1809* (2013.01); *H04L 5/0007* (2013.01); *H04L 7/06* (2013.01); *H04L 25/14* (2013.01); *H04Q 11/0428* (2013.01); *H04W 28/18* (2013.01); *H04W 72/0446* (2013.01); *H04W 74/004* (2013.01); *H04B 1/7075* (2013.01); *H04L 27/2601* (2013.01); *H04Q 2213/1327* (2013.01); *H04Q 2213/1336* (2013.01); *H04Q 2213/13098* (2013.01); *H04Q 2213/13202* (2013.01); *H04Q 2213/13204* (2013.01); *H04Q 2213/13209* (2013.01); *H04Q 2213/13216* (2013.01); *H04Q 2213/13298* (2013.01); *H04Q 2213/13332* (2013.01); *H04Q 2213/13389* (2013.01); *H04W 28/04* (2013.01); *H04W 74/04* (2013.01); *H04W 74/0833* (2013.01); *H04W 84/14* (2013.01)

(58) Field of Classification Search
USPC ..... 370/235, 230, 229, 232, 233, 234, 235.1
See application file for complete search history.

(56) References Cited

U.S. PATENT DOCUMENTS

| | | |
|---|---|---|
| 3,742,498 A | 6/1973 | Dunn |
| 3,846,799 A | 11/1974 | Guegen |
| 3,950,753 A | 4/1976 | Chisholm |
| 4,021,813 A | 5/1977 | Black et al. |
| 4,099,184 A | 7/1978 | Rapshys |
| 4,107,469 A | 8/1978 | Jenkins |
| 4,170,766 A | 10/1979 | Pridham et al. |
| 4,260,994 A | 4/1981 | Parker |
| 4,290,071 A | 9/1981 | Fenwick |
| 4,387,378 A | 6/1983 | Henderson |
| 4,448,155 A | 5/1984 | Hillebrand et al. |
| 4,577,316 A | 3/1986 | Schiff |
| 4,599,733 A | 7/1986 | Gutleber |
| 4,625,308 A | 11/1986 | Kim et al. |
| 4,631,546 A | 12/1986 | Dumas et al. |
| 4,642,806 A | 2/1987 | Hewitt et al. |
| 4,675,863 A | 6/1987 | Paneth |
| 4,700,197 A | 10/1987 | Milne |
| 4,817,089 A | 3/1989 | Paneth |
| 4,841,526 A | 6/1989 | Wilson et al. |
| 4,862,453 A | 8/1989 | West et al. |
| 4,866,709 A | 9/1989 | West et al. |
| 4,887,266 A | 12/1989 | Neve et al. |
| 4,901,307 A | 2/1990 | Gilhousen et al. |
| 4,912,705 A | 3/1990 | Paneth et al. |
| 4,949,395 A | 8/1990 | Rydbeck |
| 4,954,950 A | 9/1990 | Freeman et al. |
| 5,022,024 A | 6/1991 | Paneth et al. |
| 5,027,125 A | 6/1991 | Tang |
| 5,027,348 A | 6/1991 | Curry, Jr. |
| 5,027,400 A | 6/1991 | Baji et al. |
| 5,038,149 A | 8/1991 | Aubry et al. |
| 5,056,109 A | 10/1991 | Gilhousen et al. |
| 5,068,916 A | 11/1991 | Harrison et al. |
| 5,101,416 A | 3/1992 | Fenton et al. |
| 5,103,459 A | 4/1992 | Gilhousen et al. |
| 5,114,375 A | 5/1992 | Wellhausen et al. |
| 5,115,309 A | 5/1992 | Hang |
| 5,117,236 A | 5/1992 | Chang et al. |
| 5,124,981 A | 6/1992 | Golding |
| 5,130,983 A | 7/1992 | Heffner, III |
| 5,166,929 A | 11/1992 | Lo |
| 5,226,044 A | 7/1993 | Gupta et al. |
| 5,235,343 A | 8/1993 | Audren et al. |
| 5,257,283 A | 10/1993 | Gilhousen et al. |
| 5,267,262 A | 11/1993 | Wheatley, III |
| 5,268,900 A | 12/1993 | Hluchyj et al. |
| 5,280,472 A | 1/1994 | Gilhousen et al. |
| 5,282,222 A | 1/1994 | Fattouche et al. |
| 5,293,172 A | 3/1994 | Lamberty et al. |
| 5,294,939 A | 3/1994 | Sanford |
| 5,303,240 A | 4/1994 | Borras et al. |
| 5,309,474 A | 5/1994 | Gilhousen et al. |
| 5,325,394 A | 6/1994 | Bruckert |
| 5,325,419 A | 6/1994 | Connolly et al. |
| 5,337,316 A | 8/1994 | Weiss et al. |
| 5,339,316 A | 8/1994 | Diepstraten |
| 5,353,332 A | 10/1994 | Raith et al. |
| 5,355,374 A | 10/1994 | Hester et al. |
| 5,369,637 A | 11/1994 | Richardson et al. |
| 5,373,502 A | 12/1994 | Turban |
| 5,375,124 A | 12/1994 | D'Ambrogio et al. |
| 5,377,192 A | 12/1994 | Goodings et al. |
| 5,388,102 A | 2/1995 | Griffith et al. |
| 5,394,473 A | 2/1995 | Davidson |
| 5,412,429 A | 5/1995 | Glover |
| 5,414,728 A | 5/1995 | Zehavi |
| 5,422,887 A | 6/1995 | Diepstraten et al. |
| 5,430,452 A | 7/1995 | DuBois |
| 5,437,055 A | 7/1995 | Wheatley, III |
| 5,439,569 A | 8/1995 | Carpio |
| 5,442,625 A | 8/1995 | Gitlin et al. |
| 5,446,727 A | 8/1995 | Bruckert et al. |
| 5,463,629 A | 10/1995 | Ko |
| 5,471,463 A | 11/1995 | Hulbert |
| 5,479,176 A | 12/1995 | Zavrel, Jr. |
| 5,481,533 A | 1/1996 | Honig |
| 5,487,180 A | 1/1996 | Ohtake |
| 5,490,136 A | 2/1996 | Sereno et al. |
| 5,493,569 A | 2/1996 | Buchholz et al. |
| 5,502,447 A | 3/1996 | Kumpfbeck et al. |
| 5,511,068 A | 4/1996 | Sato |
| 5,537,397 A | 7/1996 | Abramson |
| 5,537,414 A | 7/1996 | Takiyasu et al. |
| 5,546,382 A | 8/1996 | Fujino |

(56) References Cited

U.S. PATENT DOCUMENTS

| | | |
|---|---|---|
| 5,550,828 A | 8/1996 | Gries et al. |
| 5,559,789 A | 9/1996 | Nakano et al. |
| 5,577,022 A | 11/1996 | Padovani et al. |
| 5,581,575 A | 12/1996 | Zehavi et al. |
| 5,585,850 A | 12/1996 | Schwaller |
| 5,586,113 A | 12/1996 | Adachi et al. |
| 5,586,119 A | 12/1996 | Scribano et al. |
| 5,590,156 A | 12/1996 | Carney |
| 5,590,409 A | 12/1996 | Sawahashi et al. |
| 5,592,178 A | 1/1997 | Chang et al. |
| 5,592,468 A | 1/1997 | Sato |
| 5,592,470 A | 1/1997 | Rudrapatna et al. |
| 5,592,471 A | 1/1997 | Briskman |
| 5,598,416 A | 1/1997 | Yamada et al. |
| 5,598,417 A | 1/1997 | Crisler et al. |
| 5,604,730 A | 2/1997 | Tiedemann, Jr. |
| 5,606,580 A | 2/1997 | Mourot et al. |
| 5,608,722 A | 3/1997 | Miller |
| 5,617,102 A | 4/1997 | Prater |
| 5,617,423 A | 4/1997 | Li et al. |
| 5,619,492 A | 4/1997 | Press et al. |
| 5,619,524 A | 4/1997 | Ling et al. |
| 5,621,752 A | 4/1997 | Antonio |
| 5,634,199 A | 5/1997 | Gerlach et al. |
| 5,642,348 A | 6/1997 | Barzegar et al. |
| 5,642,377 A | 6/1997 | Chung et al. |
| 5,652,764 A | 7/1997 | Kanzaki et al. |
| 5,655,001 A | 8/1997 | Cline et al. |
| 5,657,326 A | 8/1997 | Burns et al. |
| 5,657,358 A | 8/1997 | Panech et al. |
| 5,663,958 A | 9/1997 | Ward |
| 5,663,990 A | 9/1997 | Bolgiano et al. |
| 5,673,259 A | 9/1997 | Quick, Jr. |
| 5,680,142 A | 10/1997 | Smith et al. |
| 5,684,794 A | 11/1997 | Lopez et al. |
| 5,687,194 A | 11/1997 | Paneth et al. |
| 5,689,502 A | 11/1997 | Scott |
| 5,697,059 A | 12/1997 | Carney |
| 5,699,364 A | 12/1997 | Sato et al. |
| 5,708,656 A | 1/1998 | Noneman et al. |
| 5,712,869 A | 1/1998 | Lee et al. |
| 5,715,236 A | 2/1998 | Gilhousen et al. |
| 5,715,526 A | 2/1998 | Weaver, Jr. et al. |
| 5,726,981 A | 3/1998 | Ylitervo et al. |
| 5,734,646 A | 3/1998 | I et al. |
| 5,739,784 A | 4/1998 | Jan et al. |
| 5,742,592 A | 4/1998 | Scholefield et al. |
| 5,745,484 A | 4/1998 | Scott |
| 5,748,624 A | 5/1998 | Kondo |
| 5,757,767 A | 5/1998 | Zehavi |
| 5,758,288 A | 5/1998 | Dunn et al. |
| 5,764,648 A | 6/1998 | Yamane et al. |
| 5,767,807 A | 6/1998 | Pritchett |
| 5,781,542 A | 7/1998 | Tanaka et al. |
| 5,781,543 A | 7/1998 | Ault et al. |
| 5,784,406 A | 7/1998 | DeJaco et al. |
| 5,790,549 A | 8/1998 | Dent |
| 5,790,551 A | 8/1998 | Chan |
| 5,793,744 A | 8/1998 | Kanerva et al. |
| 5,796,776 A | 8/1998 | Lomp et al. |
| 5,799,010 A | 8/1998 | Lomp et al. |
| 5,802,046 A | 9/1998 | Scott |
| 5,802,465 A | 9/1998 | Hamalainen et al. |
| 5,805,583 A | 9/1998 | Rakib |
| 5,805,994 A | 9/1998 | Perreault et al. |
| 5,809,415 A | 9/1998 | Rossmann |
| 5,812,131 A | 9/1998 | Bertram |
| 5,812,543 A | 9/1998 | Sugita |
| 5,825,807 A | 10/1998 | Kumar |
| 5,828,659 A | 10/1998 | Teder et al. |
| 5,828,662 A | 10/1998 | Jalali et al. |
| 5,838,720 A | 11/1998 | Morelli |
| 5,841,768 A | 11/1998 | Ozluturk et al. |
| 5,844,894 A | 12/1998 | Dent et al. |
| 5,845,211 A | 12/1998 | Roach, Jr. |
| 5,854,786 A | 12/1998 | Henderson et al. |
| 5,854,823 A | 12/1998 | Badger et al. |
| 5,856,971 A | 1/1999 | Gitlin et al. |
| 5,859,840 A | 1/1999 | Tiedemann, Jr. et al. |
| 5,859,879 A | 1/1999 | Bolgiano et al. |
| 5,862,476 A | 1/1999 | Hasegawa |
| 5,862,488 A | 1/1999 | Kotzin et al. |
| 5,867,527 A | 2/1999 | Ziv et al. |
| 5,870,427 A | 2/1999 | Tiedemann, Jr. et al. |
| 5,872,786 A | 2/1999 | Shobatake |
| 5,873,043 A | 2/1999 | Comer |
| 5,881,060 A | 3/1999 | Morrow et al. |
| 5,881,368 A | 3/1999 | Grob et al. |
| 5,884,196 A | 3/1999 | Lekven et al. |
| 5,892,774 A | 4/1999 | Zehavi et al. |
| 5,892,793 A | 4/1999 | Gibson |
| 5,893,035 A | 4/1999 | Chen |
| 5,894,473 A | 4/1999 | Dent |
| 5,896,374 A | 4/1999 | Okumura et al. |
| 5,896,376 A | 4/1999 | Alperovich et al. |
| 5,898,929 A | 4/1999 | Haartsen |
| 5,903,834 A | 5/1999 | Wallstedt et al. |
| 5,905,473 A | 5/1999 | Taenzer |
| 5,905,719 A | 5/1999 | Arnold et al. |
| 5,910,944 A | 6/1999 | Callicotte et al. |
| 5,910,945 A | 6/1999 | Garrison et al. |
| 5,914,656 A * | 6/1999 | Ojala ............... G01D 4/004 340/521 |
| 5,914,950 A | 6/1999 | Tiedemann, Jr. et al. |
| 5,915,216 A | 6/1999 | Lysejko |
| 5,918,170 A | 6/1999 | Oksanen et al. |
| 5,923,650 A | 7/1999 | Chen et al. |
| 5,926,500 A | 7/1999 | Odenwalder |
| 5,930,230 A | 7/1999 | Odenwalder et al. |
| 5,933,781 A | 8/1999 | Willenegger et al. |
| 5,943,362 A | 8/1999 | Saito |
| 5,946,356 A | 8/1999 | Felix et al. |
| 5,949,814 A | 9/1999 | Odenwalder et al. |
| 5,950,131 A | 9/1999 | Vilmur |
| 5,956,332 A | 9/1999 | Rasanen et al. |
| 5,959,980 A | 9/1999 | Scott |
| 5,960,361 A | 9/1999 | Chen |
| 5,963,549 A | 10/1999 | Perkins et al. |
| 5,963,559 A | 10/1999 | Ohki |
| 5,966,374 A | 10/1999 | Rasanen |
| 5,974,036 A | 10/1999 | Acharya et al. |
| 5,974,310 A | 10/1999 | Bilgic |
| 5,982,760 A | 11/1999 | Chen |
| 5,990,806 A | 11/1999 | Mock et al. |
| 5,991,279 A | 11/1999 | Haugli et al. |
| 5,991,284 A | 11/1999 | Willenegger et al. |
| 5,991,618 A | 11/1999 | Hall |
| 6,001,800 A | 12/1999 | Mehta et al. |
| 6,002,690 A | 12/1999 | Takayama et al. |
| 6,005,848 A | 12/1999 | Grube et al. |
| 6,005,852 A | 12/1999 | Kokko et al. |
| 6,005,855 A | 12/1999 | Zehavi et al. |
| 6,009,106 A | 12/1999 | Rustad et al. |
| 6,011,788 A | 1/2000 | Hurst et al. |
| 6,011,800 A | 1/2000 | Nadgauda et al. |
| 6,016,312 A | 1/2000 | Storm et al. |
| 6,023,462 A | 2/2000 | Nieczyporowicz et al. |
| 6,023,474 A | 2/2000 | Gardner et al. |
| 6,028,853 A | 2/2000 | Haartsen |
| 6,028,868 A | 2/2000 | Yeung et al. |
| 6,031,827 A | 2/2000 | Rikkinen et al. |
| 6,031,832 A | 2/2000 | Turina |
| 6,034,638 A | 3/2000 | Thiel et al. |
| 6,037,905 A | 3/2000 | Koscica et al. |
| 6,038,450 A | 3/2000 | Brink et al. |
| 6,038,455 A | 3/2000 | Gardner et al. |
| 6,049,535 A | 4/2000 | Ozukturk et al. |
| 6,049,538 A | 4/2000 | Scott |
| 6,052,385 A | 4/2000 | Kanerva et al. |
| 6,058,104 A | 5/2000 | Snelling et al. |
| 6,058,338 A | 5/2000 | Agashe et al. |
| 6,061,339 A | 5/2000 | Nieczyporowicz et al. |
| 6,064,678 A | 5/2000 | Sindhushayana et al. |
| 6,069,880 A | 5/2000 | Owen et al. |

(56) References Cited

U.S. PATENT DOCUMENTS

| | | |
|---|---|---|
| 6,069,883 A | 5/2000 | Ejzak et al. |
| 6,070,071 A | 5/2000 | Chavez et al. |
| 6,075,974 A | 6/2000 | Saints et al. |
| 6,078,572 A | 6/2000 | Tanno et al. |
| 6,081,536 A | 6/2000 | Gorsuch et al. |
| 6,088,324 A | 7/2000 | Sato |
| 6,088,335 A | 7/2000 | I et al. |
| 6,094,421 A | 7/2000 | Scott |
| 6,094,576 A | 7/2000 | Häkkinen et al. |
| 6,097,707 A | 8/2000 | Hodzic et al. |
| 6,097,722 A | 8/2000 | Graham et al. |
| 6,097,733 A | 8/2000 | Basu et al. |
| 6,097,972 A | 8/2000 | Saints et al. |
| 6,100,843 A | 8/2000 | Proctor, Jr. et al. |
| 6,101,176 A | 8/2000 | Honkasalo et al. |
| 6,101,179 A | 8/2000 | Soliman |
| 6,104,708 A | 8/2000 | Bergamo |
| 6,111,863 A | 8/2000 | Rostoker et al. |
| 6,112,092 A | 8/2000 | Benveniste |
| 6,115,370 A | 9/2000 | Struhsaker et al. |
| 6,118,767 A | 9/2000 | Shen et al. |
| 6,122,330 A | 9/2000 | Motohashi |
| 6,125,148 A | 9/2000 | Frodigh et al. |
| 6,134,233 A | 10/2000 | Kay |
| 6,151,332 A | 11/2000 | Gorsuch et al. |
| 6,157,616 A | 12/2000 | Whitehead |
| 6,157,619 A | 12/2000 | Ozluturk et al. |
| 6,161,013 A | 12/2000 | Anderson et al. |
| 6,163,707 A | 12/2000 | Miller |
| 6,169,731 B1 | 1/2001 | Stewart et al. |
| 6,169,759 B1 | 1/2001 | Kanterakis et al. |
| 6,185,184 B1 | 2/2001 | Mattaway et al. |
| 6,185,266 B1 | 2/2001 | Kuchi et al. |
| 6,188,678 B1 | 2/2001 | Prescott |
| 6,188,903 B1 | 2/2001 | Gardner et al. |
| 6,195,362 B1 | 2/2001 | Darcie et al. |
| 6,198,723 B1 | 3/2001 | Parruck et al. |
| 6,198,728 B1 | 3/2001 | Hulyalkar et al. |
| 6,201,966 B1 | 3/2001 | Rinne et al. |
| 6,208,871 B1 | 3/2001 | Hall et al. |
| 6,212,175 B1 | 4/2001 | Harsch |
| 6,212,220 B1 | 4/2001 | Proctor, Jr. et al. |
| 6,214,342 B1 | 4/2001 | Alberici et al. |
| 6,214,778 B1 | 4/2001 | Todd |
| 6,215,778 B1 | 4/2001 | Lomp et al. |
| 6,215,798 B1 | 4/2001 | Carneheim et al. |
| 6,219,342 B1 | 4/2001 | Rege |
| 6,222,828 B1 | 4/2001 | Ohlson et al. |
| 6,222,832 B1 | 4/2001 | Proctor |
| 6,222,873 B1 | 4/2001 | Bang et al. |
| 6,226,279 B1 | 5/2001 | Hansson et al. |
| 6,226,527 B1 | 5/2001 | Dalsgaard et al. |
| 6,233,439 B1 | 5/2001 | Jalali |
| 6,236,646 B1 | 5/2001 | Beming et al. |
| 6,236,647 B1 | 5/2001 | Amalfitano |
| 6,236,674 B1 | 5/2001 | Morelli et al. |
| 6,243,372 B1 | 6/2001 | Petch et al. |
| 6,246,673 B1 | 6/2001 | Tiedmann et al. |
| 6,246,715 B1 | 6/2001 | Park et al. |
| 6,249,681 B1 | 6/2001 | Virtanen |
| RE37,301 E | 7/2001 | Lo |
| 6,256,334 B1 | 7/2001 | Adachi |
| 6,256,509 B1 | 7/2001 | Tanaka et al. |
| 6,259,683 B1 | 7/2001 | Sekine et al. |
| 6,262,980 B1 | 7/2001 | Leung et al. |
| 6,263,013 B1 | 7/2001 | Hendrickson |
| 6,269,075 B1 | 7/2001 | Tran |
| 6,269,088 B1 | 7/2001 | Masui et al. |
| 6,272,168 B1 | 8/2001 | Lomp et al. |
| 6,272,354 B1 | 8/2001 | Saaroi |
| 6,275,478 B1 | 8/2001 | Tiedemann, Jr. |
| 6,278,701 B1 | 8/2001 | Ayyagari et al. |
| 6,285,665 B1 | 9/2001 | Chuah |
| 6,292,474 B1 | 9/2001 | Ali et al. |
| 6,301,286 B1 | 10/2001 | Kanterakis et al. |
| 6,301,291 B1 | 10/2001 | Rouphael et al. |
| 6,304,215 B1 | 10/2001 | Proctor, Jr. et al. |
| 6,307,840 B1 | 10/2001 | Wheatley, III et al. |
| 6,310,859 B1 | 10/2001 | Morita et al. |
| 6,314,300 B1 | 11/2001 | Nakashima et al. |
| 6,317,092 B1 | 11/2001 | De Schweinitz et al. |
| 6,320,851 B1 | 11/2001 | Kim et al. |
| 6,332,008 B1 | 12/2001 | Giallorenzi et al. |
| 6,335,922 B1 | 1/2002 | Tiedemann, Jr. et al. |
| 6,337,668 B1 | 1/2002 | Ito et al. |
| 6,339,612 B1 | 1/2002 | Stewart et al. |
| 6,353,412 B1 | 3/2002 | Soliman |
| 6,353,645 B1 | 3/2002 | Solve et al. |
| 6,356,538 B1 | 3/2002 | Li |
| 6,356,555 B1 | 3/2002 | Rakib et al. |
| 6,366,570 B1 | 4/2002 | Bhagalia |
| 6,366,786 B1 | 4/2002 | Norman et al. |
| 6,370,117 B1 | 4/2002 | Koraitim et al. |
| 6,373,830 B1 | 4/2002 | Ozluturk |
| 6,373,834 B1 | 4/2002 | Lundh et al. |
| 6,377,548 B1 | 4/2002 | Chuah |
| 6,377,809 B1 | 4/2002 | Rezaiifar et al. |
| 6,388,997 B1 | 5/2002 | Scott |
| 6,388,999 B1 | 5/2002 | Gorsuch et al. |
| 6,389,000 B1 | 5/2002 | Jou |
| 6,396,804 B2 | 5/2002 | Odenwalder |
| 6,396,823 B1 | 5/2002 | Park et al. |
| 6,414,947 B1 | 7/2002 | Legg et al. |
| 6,418,148 B1 | 7/2002 | Kumar et al. |
| 6,424,645 B1 | 7/2002 | Kawabata et al. |
| 6,426,960 B2 | 7/2002 | Antonio |
| 6,452,911 B1 | 9/2002 | Seo |
| 6,452,913 B1 | 9/2002 | Proctor, Jr. |
| 6,453,176 B1 | 9/2002 | Lopes et al. |
| 6,456,608 B1 | 9/2002 | Lomp |
| 6,466,800 B1 | 10/2002 | Sydon et al. |
| 6,469,991 B1 | 10/2002 | Chuah |
| 6,473,623 B1 | 10/2002 | Benveniste |
| 6,483,816 B2 | 11/2002 | Tsunehara et al. |
| 6,490,461 B1 | 12/2002 | Muller |
| 6,498,785 B1 | 12/2002 | Derryberry et al. |
| 6,498,790 B1 | 12/2002 | Shaheen et al. |
| 6,498,939 B1 | 12/2002 | Thomas |
| 6,501,787 B1 | 12/2002 | Odenwalder et al. |
| 6,504,830 B1 | 1/2003 | Östberg et al. |
| 6,512,751 B1 | 1/2003 | Struhsaker et al. |
| 6,512,931 B1 | 1/2003 | Kim et al. |
| 6,519,452 B1 | 2/2003 | Agostino et al. |
| 6,519,651 B1 | 2/2003 | Dillon |
| 6,522,639 B1 | 2/2003 | Kitade et al. |
| 6,526,039 B1 | 2/2003 | Dahlman et al. |
| 6,526,064 B1 | 2/2003 | Bousquet |
| 6,526,281 B1 | 2/2003 | Gorsuch et al. |
| 6,532,226 B1 | 3/2003 | Lehtinent et al. |
| 6,532,365 B1 | 3/2003 | Anderson et al. |
| 6,535,545 B1 | 3/2003 | Ben-Bassat et al. |
| 6,542,481 B2 | 4/2003 | Foore et al. |
| 6,545,986 B1 | 4/2003 | Stellakis |
| 6,545,994 B2 | 4/2003 | Nelson, Jr. et al. |
| 6,546,252 B1 | 4/2003 | Jetzek et al. |
| 6,563,808 B1 | 5/2003 | Cox et al. |
| 6,567,389 B1 | 5/2003 | Honkasalo et al. |
| 6,567,391 B1 | 5/2003 | Moon |
| 6,567,416 B1 | 5/2003 | Chuah |
| 6,567,670 B1 | 5/2003 | Petersson |
| 6,570,865 B2 | 5/2003 | Masui et al. |
| 6,571,296 B1 | 5/2003 | Dillon |
| 6,574,211 B2 | 6/2003 | Padovani et al. |
| 6,587,446 B2 | 7/2003 | Sarkar et al. |
| 6,597,913 B2 | 7/2003 | Natarajan |
| 6,611,231 B2 | 8/2003 | Crilly et al. |
| 6,611,514 B1 | 8/2003 | Moulsley |
| 6,621,807 B1 | 9/2003 | Jung et al. |
| 6,621,808 B1 | 9/2003 | Sadri |
| 6,621,809 B1 | 9/2003 | Lee et al. |
| 6,628,945 B1 | 9/2003 | Koorapaty et al. |
| 6,633,554 B1 | 10/2003 | Dalal |
| 6,647,000 B1 | 11/2003 | Persson et al. |
| 6,674,739 B1 | 1/2004 | Lee et al. |

(56) References Cited

U.S. PATENT DOCUMENTS

| | | |
|---|---|---|
| 6,687,509 B2 | 2/2004 | Schmutz et al. |
| 6,690,652 B1 | 2/2004 | Sadri |
| 6,690,938 B1 | 2/2004 | Chin |
| 6,697,642 B1 | 2/2004 | Thomas |
| 6,707,804 B2 | 3/2004 | Proctor, Jr. |
| 6,707,806 B1 | 3/2004 | Kato |
| 6,717,916 B1 | 4/2004 | Ahn et al. |
| 6,718,180 B1 | 4/2004 | Lundh et al. |
| 6,724,740 B1 | 4/2004 | Choi et al. |
| 6,724,743 B1 | 4/2004 | Pigeonnat |
| 6,731,954 B1 | 5/2004 | Katz |
| 6,735,188 B1 | 5/2004 | Becker et al. |
| 6,760,596 B1 | 7/2004 | Fiorini et al. |
| 6,768,727 B1 | 7/2004 | Sourour et al. |
| 6,775,558 B1 | 8/2004 | Ranta et al. |
| 6,782,277 B1 | 8/2004 | Chen et al. |
| 6,785,247 B1 | 8/2004 | Lee |
| 6,788,661 B1 | 9/2004 | Ylitalo et al. |
| 6,795,416 B1 | 9/2004 | Han et al. |
| 6,804,219 B2 | 10/2004 | Koo et al. |
| 6,807,221 B1 | 10/2004 | Kim et al. |
| 6,826,169 B1 | 11/2004 | Nagatani et al. |
| 6,831,910 B1 | 12/2004 | Moon et al. |
| 6,842,482 B1 | 1/2005 | Hiramatsu |
| 6,845,089 B1 | 1/2005 | Gu et al. |
| 6,868,075 B1 | 3/2005 | Narvinger et al. |
| 6,925,057 B2 | 8/2005 | Cheng et al. |
| 6,925,068 B1 | 8/2005 | Stanwood et al. |
| 6,931,252 B1 | 8/2005 | Aroudaki |
| 6,934,319 B2 | 8/2005 | Subramanian |
| 6,940,845 B2 | 9/2005 | Benveniste |
| 6,954,444 B2 | 10/2005 | Ji et al. |
| 6,956,840 B1 | 10/2005 | Proctor, Jr. |
| 6,963,540 B2 | 11/2005 | Choi et al. |
| 6,977,910 B1 | 12/2005 | Hosur et al. |
| 6,999,425 B2 | 2/2006 | Cheng et al. |
| 6,999,471 B1 | 2/2006 | Frazer et al. |
| 7,027,420 B2 | 4/2006 | Hamalainen |
| 7,039,029 B2 | 5/2006 | Lee et al. |
| 7,046,717 B2 | 5/2006 | Kanterakis et al. |
| 7,054,293 B2 | 5/2006 | Tiedemann, Jr. et al. |
| 7,079,507 B2 | 7/2006 | Toskala et al. |
| 7,079,523 B2 | 7/2006 | Nelson, Jr. |
| 7,092,372 B1 | 8/2006 | Jensen et al. |
| 7,099,629 B1 | 8/2006 | Bender |
| 7,136,377 B1 | 11/2006 | Tweedly et al. |
| 7,158,504 B2 | 1/2007 | Kadaba et al. |
| 7,218,623 B1 | 5/2007 | Proctor, Jr. |
| 7,221,664 B2 | 5/2007 | Proctor, Jr. |
| 7,224,683 B1 | 5/2007 | Marque-Pucheu et al. |
| 7,236,467 B2 | 6/2007 | Kono |
| 7,266,107 B2 | 9/2007 | Choi et al. |
| 7,340,256 B2 | 3/2008 | Speight |
| 7,480,280 B2 | 1/2009 | Proctor, Jr. |
| 2001/0030990 A1 | 10/2001 | Rouphael et al. |
| 2001/0033558 A1 | 10/2001 | Matsuki |
| 2001/0036200 A1 | 11/2001 | Nelson et al. |
| 2001/0038674 A1 | 11/2001 | Trans |
| 2001/0039191 A1 | 11/2001 | Maierhofer |
| 2002/0009061 A1 | 1/2002 | Willenegger |
| 2002/0009096 A1 | 1/2002 | Odenwalder |
| 2002/0012332 A1 | 1/2002 | Tiedemann, Jr. |
| 2002/0045441 A1 | 4/2002 | Ralston et al. |
| 2002/0080024 A1 | 6/2002 | Nelson et al. |
| 2002/0097700 A1 | 7/2002 | Alastalo |
| 2002/0141478 A1 | 10/2002 | Ozluturk et al. |
| 2003/0060224 A1 | 3/2003 | Nelson, Jr. et al. |
| 2003/0095517 A1 | 5/2003 | Proctor, Jr. |
| 2003/0123401 A1 | 7/2003 | Dean |
| 2004/0005078 A1 | 1/2004 | Tillotson |
| 2004/0009785 A1 | 1/2004 | Nelson, Jr. et al. |
| 2004/0047328 A1 | 3/2004 | Proctor et al. |
| 2004/0073803 A1 | 4/2004 | Keramane |
| 2004/0160910 A1 | 8/2004 | Gorsuch et al. |
| 2004/0180696 A1 | 9/2004 | Foore et al. |
| 2005/0202823 A1 | 9/2005 | Shaheen et al. |
| 2005/0208961 A1 | 9/2005 | Willenegger |
| 2008/0225766 A1 | 9/2008 | Roy et al. |

FOREIGN PATENT DOCUMENTS

| | | |
|---|---|---|
| EP | 0 443 061 | 8/1991 |
| EP | 0 526 106 | 2/1993 |
| EP | 0 682 423 | 11/1995 |
| EP | 0 682 426 | 11/1995 |
| EP | 0 719 062 | 6/1996 |
| EP | 0 720 309 | 7/1996 |
| EP | 0 475 698 | 3/1997 |
| EP | 0 760 564 | 3/1997 |
| EP | 0760564 | 3/1997 |
| EP | 0 773 636 | 5/1997 |
| EP | 0 808 074 | 11/1997 |
| EP | 0818901 | 1/1998 |
| EP | 0 907 262 | 4/1999 |
| EP | 0 910 176 | 4/1999 |
| EP | 0 959 851 | 11/1999 |
| EP | 1 018 809 | 12/2000 |
| EP | 1 102 512 | 5/2001 |
| EP | 1102512 | 5/2001 |
| GB | 2243973 | 11/1991 |
| GB | 2 326 524 | 12/1998 |
| JP | 59-050603 | 3/1984 |
| JP | 1221042 | 9/1989 |
| JP | 02-177643 | 7/1990 |
| JP | 03-049324 | 3/1991 |
| JP | 04-284033 | 10/1992 |
| JP | 05-030006 | 2/1993 |
| JP | 07-067164 | 3/1995 |
| JP | 07-095151 | 4/1995 |
| JP | 07-131398 | 5/1995 |
| JP | 07131398 | 5/1995 |
| JP | 07-264098 | 10/1995 |
| JP | 08-065273 | 3/1996 |
| JP | 865273 | 3/1996 |
| JP | 08-242482 | 9/1996 |
| JP | 09-023203 | 1/1997 |
| JP | 09-046270 | 2/1997 |
| JP | 09-055693 | 2/1997 |
| JP | 9214459 | 8/1997 |
| JP | 11150530 | 6/1999 |
| JP | 11331131 | 11/1999 |
| JP | 2000-013867 | 1/2000 |
| JP | 2000092019 | 3/2000 |
| JP | 2000-188597 | 7/2000 |
| JP | 2000188597 | 7/2000 |
| JP | 2000236343 | 8/2000 |
| JP | 2000236573 | 8/2000 |
| JP | 2001024706 | 1/2001 |
| JP | 2005504460 | 2/2005 |
| JP | 2007251966 | 9/2007 |
| JP | 5112811 | 1/2013 |
| TW | 566045 | 12/2003 |
| TW | 200536325 | 11/2005 |
| WO | 93/15573 | 8/1993 |
| WO | WO9315573 | 8/1993 |
| WO | WO-9321719 | 10/1993 |
| WO | WO-9505053 | 2/1995 |
| WO | 95/08900 | 3/1995 |
| WO | WO-9530289 | 11/1995 |
| WO | 96/08934 | 3/1996 |
| WO | 96/19050 | 6/1996 |
| WO | WO9619050 | 6/1996 |
| WO | WO-9626582 | 8/1996 |
| WO | 96/37081 | 11/1996 |
| WO | WO-9637079 | 11/1996 |
| WO | 96/27994 | 12/1996 |
| WO | 97/46041 | 4/1997 |
| WO | 97/23073 | 6/1997 |
| WO | 97/26726 | 7/1997 |
| WO | 97/32412 | 9/1997 |
| WO | WO-9734387 | 9/1997 |
| WO | WO-9736405 | 10/1997 |
| WO | WO9737456 | 10/1997 |
| WO | 97/46044 | 12/1997 |

(56) References Cited

FOREIGN PATENT DOCUMENTS

| WO | WO-9749201 | 12/1997 |
| --- | --- | --- |
| WO | 98/09455 | 3/1998 |
| WO | WO-9859523 | 12/1998 |
| WO | WO-9908398 | 2/1999 |
| WO | 99/14869 | 3/1999 |
| WO | 99/25125 | 5/1999 |
| WO | 99/31811 | 6/1999 |
| WO | 99/49596 | 9/1999 |
| WO | WO-99/49596 | 9/1999 |
| WO | 99/52306 | 10/1999 |
| WO | 99/63382 | 12/1999 |
| WO | 99/63682 | 12/1999 |
| WO | WO-9963682 | 12/1999 |
| WO | WO-9963713 | 12/1999 |
| WO | 00/57663 | 9/2000 |
| WO | 00/62449 | 10/2000 |
| WO | WO-0062435 | 10/2000 |
| WO | WO-0062456 | 10/2000 |
| WO | 00/72464 | 11/2000 |
| WO | WO-02061993 | 8/2002 |

OTHER PUBLICATIONS

Non-Final Office Action for U.S. Appl. No. 12/768,445 mailed Aug. 24, 2010, 7 pages.
Notice of Allowance for U.S. Appl. No. 12/768,445 mailed Jan. 27, 2012, 5 pages.
Notice of Allowance for U.S. Appl. No. 12/768,445 mailed Aug. 8, 2011, 5 pages.
Notice of Allowance for U.S. Appl. No. 12/768,445 mailed May 9, 2011, 5 pages.
Notice of Allowance for U.S. Appl. No. 12/768,445 mailed Jan. 27, 2011, 4 pages.
Non-Final Office Action for U.S. Appl. No. 09/997,732 mailed Dec. 16, 2008, 11 pages.
Non-Final Office Action for U.S. Appl. No. 09/997,732 mailed Jul. 25, 2007, 18 pages.
Non-Final Office Action for U.S. Appl. No. 09/997,732 mailed Sep. 7, 2006, 13 pages.
Non-Final Office Action for U.S. Appl. No. 09/997,732 mailed Sep. 21, 2005, 8 pages.
Final Office Action for U.S. Appl. No. 09/997,732 mailed Jun. 29, 2009, 12 pages.
Final Office Action for U.S. Appl. No. 09/997,732 mailed Jun. 23, 2008, 10 pages.
Final Office Action for U.S. Appl. No. 09/997,732 mailed Mar. 8, 2006, 8 pages.
Notice of Allowance for U.S. Appl. No. 09/997,732 mailed Mar. 9, 2011, 5 pages.
Supplemental Notice of Allowability for U.S. Appl. No. 09/997,732 mailed Jan. 26, 2011, 2 pages.
Notice of Allowance for U.S. Appl. No. 09/997,732 mailed Nov. 3, 2010, 4 pages.
Supplemental Notice of Allowability for U.S. Appl. No. 09/997,732 mailed Dec. 21, 2010, 2 pages.
Notice of Allowance for U.S. Appl. No. 09/997,732 mailed May 13, 2010, 4 pages.
Notice of Allowance for U.S. Appl. No. 09/997,732 mailed Dec. 16, 2009, 8 pages.
Non-Final Office Action for U.S. Appl. No. 09/997,733 mailed Mar. 5, 2008, 8 pages.
Non-Final Office Action for U.S. Appl. No. 09/997,733 mailed Apr. 20, 2007, 6 pages.
Non-Final Office Action for U.S. Appl. No. 09/997,733 mailed Aug. 23, 2006, 7 pages.
Non-Final Office Action for U.S. Appl. No. 09/997,733 mailed Aug. 10, 2005, 11 pages.
Supplemental Notice of Allowability for U.S. Appl. No. 09/997,733 mailed Nov. 13, 2008, 7 pages.
Supplemental Notice of Allowability for U.S. Appl. No. 09/997,733 mailed Mar. 14, 2006, 4 pages.
Notice of Allowance for U.S. Appl. No. 09/997,733 mailed Sep. 25, 2008, 9 pages.
Notice of Allowance for U.S. Appl. No. 09/997,733 mailed Nov. 19, 2007, 11 pages.
Notice of Allowance for U.S. Appl. No. 09/997,733 mailed Jan. 25, 2006, 4 pages.
Non-Final Office Action for U.S. Appl. No. 10/755,874 mailed Dec. 7, 2004, 6 pages.
Notice of Allowance for U.S. Appl. No. 10/755,874 mailed Apr. 12, 2005, 6 pages.
Notice of Allowance for U.S. Appl. No. 10/761,130 mailed Mar. 28, 2005, 6 pages.
Final Office Action for U.S. Appl. No. 11/183,520 mailed Apr. 30, 2009, 5 pages.
Non-Final Office Action for U.S. Appl. No. 11/183,520 mailed Aug. 6, 2009, 7 pages.
Non-Final Office Action for U.S. Appl. No. 11/183,520 mailed Sep. 26, 2008, 4 pages.
Notice of Allowance for U.S. Appl. No. 11/183,520 mailed Jan. 27, 2010, 4 pages.
Non-Final Office Action for U.S. Appl. No. 11/183,677 mailed Nov. 28, 2005, 5 pages.
Supplemental Notice of Allowability for U.S. Appl. No. 11/183,677 mailed Sep. 10, 2008, 3 pages.
Supplemental Notice of Allowability for U.S. Appl. No. 11/183,677 mailed Jul. 17, 2008, 3 pages.
Notice of Allowance for U.S. Appl. No. 11/183,677 mailed May 12, 2008, 7 pages.
Notice of Allowance for U.S. Appl. No. 11/183,677 mailed Jan. 28, 2008, 6 pages.
Notice of Allowance for U.S. Appl. No. 11/183,677 mailed Oct. 30, 2007, 4 pages.
Notice of Allowance for U.S. Appl. No. 11/183,677 mailed Sep. 6, 2007, 4 pages.
Notice of Allowance for U.S. Appl. No. 11/183,677 mailed Feb. 28, 2007, 4 pages.
Notice of Allowance for U.S. Appl. No. 11/183,677 mailed Aug. 30, 2006, 4 pages.
Supplemental Notice of Allowability for U.S. Appl. No. 11/183,677 mailed Apr. 26, 2006, 2 pages.
Supplemental Notice of Allowability for U.S. Appl. No. 11/183,677 mailed Apr. 19, 2006, 2 pages.
Notice of Allowance for U.S. Appl. No. 11/183,677 mailed Feb. 16, 2006, 6 pages.
Non-Final Office Action for U.S. Appl. No. 10/895,591 mailed Dec. 17, 2008, 9 pages.
Non-Final Office Action for U.S. Appl. No. 10/895,591 mailed Nov. 1, 2007, 10 pages.
Final Office Action for U.S. Appl. No. 10/895,591 mailed May 18, 2009, 10 pages.
Final Office Action for U.S. Appl. No. 10/895,591 mailed Jun. 25, 2008, 9 pages.
Supplemental Notice of Allowability for U.S. Appl. No. 10/895,591 mailed May 17, 2010, 2 pages.
Notice of Allowance for U.S. Appl. No. 10/895,591 mailed Feb. 5, 2010, 4 pages.
Notice of Allowance for U.S. Appl. No. 10/895,591 mailed Sep. 24, 2009, 4 pages.
Final Notice of Reasons for Rejection for Japanese Application No. 2012-186900 mailed Feb. 24, 2015, 19 pages.
Notice of Allowance for Canadian Application No. 2,834,031, mailed Mar. 26, 2015, 1 page.
Non-Final Office Action for U.S. Appl. No. 13/892,663 mailed Apr. 9, 2015, 11 pages.
Examination Report for European Patent Application No. 10180797.2, mailed Apr. 7, 2015, 6 pages.
Notice of Allowance for Canadian Patent Application No. 2,670,758 mailed Feb. 10, 2015, 1 page.
Official Action & Search Report for Norwegian Patent Application No. 20033238, mailed Sep. 19, 2013, 8 pages.

(56) References Cited

OTHER PUBLICATIONS

Office Action for Japanese Patent Application No. 2013-002916, mailed Nov. 12, 2013, 4 pages.
Notice of Allowance for U.S. Appl. No. 13/423,859, mailed Feb. 18, 2014, 11 pages.
Examination Report for European Patent Application No. 10180797.2, mailed Jan. 20, 2014, 7 pages.
Final Office Action for Japanese Application No. 2011-177740, mailed Nov. 12, 2013, 4 pages.
Office Action for Japanese Application No. 2011-177740, mailed Oct. 30, 2012, 12 pages.
Final Office Action for Japanese Application No. 2012-141289, mailed Nov. 12, 2013, 4 pages.
Office Action for Japanese Application No. 2012-141289, mailed Oct. 30, 2012, 11 pages.
Reasons for Rejection for Japanese Application No. 2012-186900, mailed Jun. 11, 2013, 7 pages.
Office Action for Japanese Application No. 2012-186900, mailed Jan. 29, 2013, 3 pages.
Examiner's Report for Canadian Application No. 2,834,031, mailed Jan. 10, 2014, 3 pages.
Final Office Action for U.S. Appl. No. 12/788,716, mailed May 15, 2012, 16 pages.
Office Action for U.S. Appl. No. 12/788,716, mailed Apr. 22, 2011, 14 pages.
Office Action for U.S. Appl. No. 12/788,716, mailed Oct. 20, 2011, 15 pages.
Office Action for U.S. Appl. No. 12/788,716, mailed Apr. 16, 2013, 20 pages.
Office Action for U.S. Appl. No. 12/788,716, mailed Nov. 5, 2013, 4 pages.
Non-Final Office Action issued for U.S. Appl. No. 13/423,859, mailed Jul. 31, 2013, 14 pages.
Exam Report for European Patent Application No. 11162402.9, mailed Sep. 23, 2013, 5 pages.
Decision of Refusal for Japanese Application No. 2012-186900 mailed Dec. 10, 2013, 8 pages.
Office Action for European Patent Application No. 10180797.2, mailed Mar. 19, 2013, 8 pages.
Extended European Search Report for European Patent Application No. 10180797.2, mailed Oct. 28, 2010, 10 pages.
Final Office Action for U.S. Appl. No. 12/788,716, mailed Mar. 28, 2014, 4 pages.
Office Action for U.S. Appl. No. 13/554,602 mailed Mar. 12, 2014, 6 pages.
Non-Final Office Action for U.S. Appl. No. 10/171,378 mailed Sep. 28, 2006, 7 pages.
Non-Final Office Action for U.S. Appl. No. 10/171,378 mailed Jun. 27, 2007, 11 pages.
Notice of Allowance for U.S. Appl. No. 10/171,378 mailed Feb. 19, 2008, 6 pages.
Examination Report for Canadian Patent Application No. 2,670,758 mailed May 27, 2013, 3 pages.
Office Action for Canadian Patent Application No. 2,670,758 mailed Jul. 31, 2012, 2 pages.
Office Action for Chinese Patent Application No. 200610091261.4 mailed Nov. 7, 2012, 31 pages.
Office Action for Chinese Patent Application No. 200610091261.4 mailed Aug. 29, 2008, 41 pages.
Extended European Search Report for European Patent Application No. 11156846.5 mailed Mar. 30, 2011, 7 pages.
Office Action for European Patent Application No. 11156846.5 mailed Jan. 5, 2012, 6 pages.
Extended European Search Report for European Patent Application No. 11162402.9, mailed Jun. 1, 2011, 17 pages.
Office Action for European Patent Application No. 11162402.9, mailed Sep. 3, 2012, 4 pages.
Extended European Search Report for European Patent Application No. 11162409.4 mailed Jun. 1, 2011, 10 pages.
Office Action for European Patent Application No. 11162409.4 mailed Sep. 26, 2012, 6 pages.
Final Office Action for Japanese Patent Application No. 2007-270641 mailed Oct. 22, 2010, 8 pages.
Final Office Action for Japanese Patent Application No. 2007-270641 mailed Mar. 30, 2012, 6 pages.
Office Action for Japanese Patent Application No. 2012-000481 mailed Aug. 21, 2012, 6 pages.
Office Action for Japanese Patent Application No. 2012-165134 mailed Jan. 22, 2013, 3 pages.
Search and Examination Report for Singapore Patent Application No. 201004134-1 mailed Oct. 24, 2012, 10 pages.
Non-Final Office Action for U.S. Appl. No. 12/165,422 mailed Jul. 22, 2013, 5 pages.
Non-Final Office Action for U.S. Appl. No. 12/165,422 mailed Nov. 6, 2013, 5 pages.
Notice of Allowance for U.S. Appl. No. 12/165,422 mailed Apr. 4, 2014, 5 pages.
Office Action for European Patent Application No. 11162409.4 mailed Mar. 5, 2012, 5 pages.
Office Action for European Patent Application No. 11162402.9, mailed Mar. 5, 2012, 6 pages.
Official Action for Norwegian Patent Application No. 20083653 mailed Mar. 22, 2014, 4 pages.
Official Action and Search Report for Norwegian Patent Application No. 20083653 mailed Jun. 19, 2013, 10 pages.
Examiner's Report for Canadian Application No. 2,834,031, mailed Jul. 17, 2014, 2 pages.
Examiner's Report for Canadian Patent Application No. 2,700,343 mailed Jun. 16, 2014, 3 pages.
Examiner's Report for Canadian Patent Application No. 2,700,343 mailed Feb. 8, 2013, 2 pages.
Examination Report for Canadian Patent Application No. 2,670,758 mailed May 21, 2014, 3 pages.
Notice of Allowance for U.S. Appl. No. 13/554,602 mailed Jul. 3, 2014, 7 pages.
Notice of Allowance for U.S. Appl. No. 10/764,196 mailed May 21, 2009, 10 pages.
Notice of Allowance for U.S. Appl. No. 10/764,196 mailed Oct. 16, 2008, 6 pages.
Notice of Allowance for U.S. Appl. No. 10/764,196 mailed May 19, 2008, 4 pages.
Notice of Allowance for U.S. Appl. No. 10/764,196 mailed Apr. 25, 2007, 4 pages.
Restriction Requirement for U.S. Appl. No. 10/764,196 mailed Feb. 24, 2009, 7 pages.
Restriction Requirement for U.S. Appl. No. 10/764,196 mailed Nov. 30, 2007, 7 pages.
Non-Final Office Action for U.S. Appl. No. 10/764,196 mailed Jul. 19, 2006, 5 pages.
Non-Final Office Action for U.S. Appl. No. 10/764,196 mailed Oct. 7, 2005, 4 pages.
Non-Final Office Action for U.S. Appl. No. 10/763,788 mailed Oct. 5, 2007, 5 pages.
Non-Final Office Action for U.S. Appl. No. 10/763,788 mailed Dec. 20, 2006, 5 pages.
Notice of Allowance for U.S. Appl. No. 10/776,424 mailed Oct. 29, 2008, 6 pages.
Non-Final Office Action for U.S. Appl. No. 10/776,424 mailed Aug. 5, 2008, 5 pages.
Non-Final Office Action for U.S. Appl. No. 10/776,424 mailed Jan. 29, 2008, 6 pages.
Non-Final Office Action for U.S. Appl. No. 10/776,424 mailed Aug. 22, 2007, 5 pages.
Non-Final Office Action for U.S. Appl. No. 10/776,424 mailed Nov. 30, 2006, 4 pages.
Supplemental Notice of Allowability for U.S. Appl. No. 10/776,558 mailed Dec. 22, 2008, 2 pages.
Notice of Allowance for U.S. Appl. No. 10/776,558 mailed Apr. 2, 2009, 6 pages.
Notice of Allowance for U.S. Appl. No. 10/776,558 mailed Oct. 29, 2008, 6 pages.

(56) References Cited

OTHER PUBLICATIONS

Notice of Allowance for U.S. Appl. No. 10/776,558 mailed Apr. 7, 2008, 4 pages.
Notice of Allowance for U.S. Appl. No. 10/776,558 mailed Feb. 2, 2007, 7 pages.
Non-Final Office Action for U.S. Appl. No. 10/776,558 mailed Aug. 14, 2008, 6 pages.
Non-Final Office Action for U.S. Appl. No. 10/776,558 mailed Jun. 28, 2007, 6 pages.
Non-Final Office Action for U.S. Appl. No. 10/776,558 mailed Jun. 20, 2006, 5 pages.
Notice of Allowance for U.S. Appl. No. 12/498,099 mailed May 27, 2011, 9 pages.
Notice of Allowance for U.S. Appl. No. 12/498,099 mailed Oct. 17, 2011, 8 pages.
Notice of Allowance for U.S. Appl. No. 12/498,099 mailed Jan. 25, 2012, 8 pages.
Notice of Allowance for U.S. Appl. No. 12/498,099 mailed May 3, 2012, 8 pages.
Non-Final Office Action for U.S. Appl. No. 12/498,099 mailed Sep. 15, 2010, 10 pages.
Non-Final Office Action for U.S. Appl. No. 12/498,099 mailed Jan. 7, 2010, 6 pages.
Notice of Allowance for U.S. Appl. No. 13/571,164 mailed Mar. 20, 2013, 9 pages.
Non-Final Office Action for U.S. Appl. No. 13/571,164 mailed Oct. 11, 2012, 9 pages.
Attachment 2, *High Speed Data RLP* Lucent Technologies, Version 0.1, Jan. 16, 1997.
Azad et al., Multirate Spread Spectrum Direct Sequence CDMA Techniques, 1994, The Institute of Electrical Engineers.
Bell Labs Technical Journal, Lucent Technologies, vol. 2, No. 3, Summer 1997.
Budka et al., Cellular Digital Packet Data Networks, Bell Labs Technical Journal, Summer 1997, pp. 164-181.
Cellular Digital Packet Data, System Specification, Release 1.1, Jan. 19, 1995.
Chelouah, A., et al., "Angular Diversity Based on Beam Switching of Circular Arrays for Hiperlan Terminals," *Electronics Letters*, vol. 36, No. 5, pp. 387-388, (Mar. 2, 2000).
Chih-Lin I et al., IS-95 Enhancements for Multimedia Services, Bell Labs Technical Journal, pp. 60-87, Autumn 1996.
Chih-Lin I et al., Load and Interference Based Demand Assignment (LIDA) for Integrated Services in CDMA Wireless Systems, Nov. 18, 1996, pp. 235-241.
Chih-Lin I et al., Multi-Code CDMA Wireless Personal Communications Networks, Jun. 18, 1005.
Chih-Lin I et al., Performance of Multi-Code CDMA Wireless Personal Communications Networks, Jul. 25, 1995.
Chih-Lin I et al., Variable Spreading Gain CDMA with Adaptive Control for True Packet Switching Wireless Network, 1995, pp. 725-730.
Chung, Packet Synchronization and Identification for Incremental Redundancy Transmission in FH-CDMA Systems, 1992, IEEE, pp. 292-295.
*Data Service Options for Wideband Spread Spectrum Systems*. TIA/EIA Interim Standard. TIA/EIA/IS-707-A. Apr. 1999.
Data Service Options for Wideband Spread Spectrum Systems: Introduction, PN-3676. 1 (to be published as TIA/EIA/IS-707.1), Mar. 20, 1997 (Content Revision 1).
*Data Services Option Standard for Wideband Spread Spectrum Digital Cellular System*. TIA/EIA/IS-99. TIA/EIA Interim Standard. Jul. 1995.
*Data Services Options Standard for Wideband Spread Spectrum Systems: Packet Data Services*. PN-3676.5 (to be published as TIA/EIA/IS-707.5) Ballot Version, May 30, 1997.
Data Standard, Packet Data Section, PN-3676.5 (to be published as TIA/EIA/IS-DATA.5), Dec. 8, 1996, Version 02 (Content Revision 03).

Draft Text for "*95C" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-98120814-95c,%20part%201.pdf).
Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf,1998).
Durnan, G.J., et al. "Optimization of Microwave Parabolic Antenna Systems Using Switched Parasitic Feed Structures," URSI National Science Meeting, Boulder, CO, p. 323, (Jan. 4-8, 2000).
Durnan, G.J., et al., "Switched Parasitic Feeds for Parabolic Antenna Angle Diversity," *Microwave and Optical Tech. Letters*, vol. 23, No. 4, pp. 200-2003(Nov. 20, 1999).
Ejzak et al., Lucent Technologies Air Interface Proposal for CDMA High Speed Data Service, Revision 0.1, May 5, 1997.
Ejzak et al., Lucent Technologies Air Interface Proposal for CDMA High Speed Data Service, Apr. 14, 1997.
Ejzak, et al. *Proposal for High Speed Packet Data Service, Version 0.1*. Lucent Technologies, Jan. 16, 1997.
Elhakeem, Congestion Control in Signalling Free Hybrid ATM/CDMA Satellite Network, IEEE, 1995, pp. 783-787
Giger, A.J., *Low-Angle Microwave Propagation: Physics and Modeling*, Norwood, MA, Artech House, (1991).
Hall et al., Design and Analysis of Turbo Codes on Rayleigh Fading Channels, IEEE Journal on Selected Areas in Communication, vol. 16, No. 2, Feb. 1998, pp. 160-174.
Harrington, R.F., "Reactively Controlled Antenna Arrays," *IEEE APS International Symposium Digest*, Amherst, MA , pp. 62-65, (Oct. 1976).
Harrington, R.F., "Reactively Controlled Directive Arrays," *IEEE Trans. Antennas and Propagation*, vol. AP-26, No. 3, pp. 390-395, (May 1978).
Heine, Gunnar, "The Air-Interface of GSM", in GSM Networks: Protocols, Terminology, and Implementation, (MA: Artech House, Inc.), pp. 89-100 (1999).
High Data Rate (HDR) Solution, Qualcomm, Dec. 1998.
High Data Rate (HDR), cdmaOne optimized for high speed, high capacity data, Wireless Infrastructure, Qualcomm, Sep. 1998.
Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.
Honkasalo, Harri. *High Speed Data Air Interface*. 1996.
*Introduction to cdma2000 Spread Spectrum Systems, Release C*. TIA/EIA Interim Standard. TIA/EIA/IS-2000.1-C. May 2002.
James , J.R. et al., "Electrically Short Monopole Antennas with Dielectric or Ferrite Coatings," Proc. IEEE, vol. 125, pp. 793-803, (Sep. 1978).
James, J.R., et al., "Reduction of Antenna Dimensions with Dielectric Loading," *Electronics Letters*, vol. 10, No. 13, pp. 263-265, (May 1974).
Kaiser et al., Multi-Carrier CDMA with Iterative Decoding and Soft-Interference Cancellation, Proceedings of Globecom 1997, vol. 1, pp. 523-529.
King, R.W.P., "The Many Faces of the Insulated Antenna," Proc. IEEE, vol. 64, No. 2, pp. 228-238, (Feb. 1976).
Kingsley, S.P., et al., "Beam Steering and Monopulse Processing of Probe-Fed Dielectric Resonator Antennas," *IEEE Proc.-Radar, Sonar, Navigation*, vol. 146, No. 3, pp. 121-125, (Jun. 1999).
Knight, P., "Low-Frequency Behavior of the Beverage Aerial," *Electronics Letter*, vol. 13, No. 1, pp. 21-22, (Jan. 1977).
Knisely, Douglas, N. Telecommunications Industry Association Subcommittee TR-45.5—*Wideband Spread Spectrum Digital Technologies Standards*. Banff, Alberta. Feb. 24, 1997 (TR45.5/97.02.24)21.
Knisely, Douglas, N. Telecommunications Industry Association Subcommittee TR-45.5—Wideband Spread Spectrum Digital Technologies Standards, Working Group III—Physical Layer. Banff, Alberta. Feb. 24, 1997 (TR45.5/97.02.24)22.
Knisely, Lucent Technologies Air Interface Proposal for CDMA High Speed Data Service, Jan. 16, 1997.

(56) References Cited

OTHER PUBLICATIONS

Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.
Kumar et al, An Access Scheme for High Speed Packet Data Service on IS-95 based CDMA, Feb. 11, 1997.
Lau et al., A Channel-State-Dependent Bandwidth Allocation scheme for Integrated Isochronous and Bursty Media Data in a Cellular Mobile Information System, IEEE, 2000, pp. 524-528.
Lee et al., "A Novel Hybrid CDMA/TDMA Protocol with a Reservation Request Slot for Wireless ATM Networks," IEICE Transactions on Communications, vol. E82-B, No. 7, pp. 1073-1076 (Jul. 25, 1999).X.
Liu et al., Channel Access and Interference Issues in Multi-Code DS-CDMA Wireless Packet (ATM) Networks, Wireless Networks 2, pp. 173-196, 1996.
Long, S.A., et al., "The Resonant Cylindrical Dielectric Cavity Antenna," *IEEE Trans. Antennas and Propagation*, vol. AP-31, No. 3, pp. 406-412, (May 1983).
Lu, J., et al., "Multi-beam Switched Parasitic Antenna Embedded in Dielectric for Wireless Communications Systems," *Electronics Letters*, vol. 37, No. 14, pp. 871-872, (Jul. 5, 2001).
Lucent Technologies Presentation First Slide Titled, Summary of Multi-Channel Signaling Protocol, Apr. 6, 1997.
Lucent Technologies Presentation First Slide Titled, Why Support Symmetric HSD (Phase 1C), Feb. 21, 1997.
Luzwick, J., et al., "A Reactively Loaded Aperture Antenna Array," *IEEE Trans. Antennas and Propagation*, vol. AP-26, No. 4, pp. 543-547, (Jul. 1978).
McCallister, M.W. et al., "Resonant Hemispherical Dielectric Antenna," *Electronics Letters*, vol. 20, No. 16, pp. 657-659, (Aug. 1984).
McCallister, M.W., et al., "Rectangular Dielectric Resonator Antenna," *Electronics Letter*, vol. 19, No. 6, pp. 218-219, (Mar. 1983).
Melanchuk et al. *CDPD and Emerging Digital Cellular Systems*, Digest of Papers of COMPCN, Computer Society Conference 1996, Santa Clara, CA, No. CONF. 41, Feb. 25, 1996, pp. 2-8, XP000628458.
Milne, R.M.T., "A Small Adaptive Array Antenna for Mobile Communications," *IEEE APS International Symposium Digest*, pp. 797-800, (1985).
Mobile Station-Base Station Compatibility Standard for Dual-Mode Wideband Spread Spectrum Cellular Systems, TIA Interim Standard, TIA/EIA/IS-95-A (Addendum to TIA/EIA/IS-95), May 1995.
Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.
Motorola, Version 1.0. *Motorola High Speed Data Air Interface Proposal Comparisions and Recommendations*. Jan. 27, 1997.
*MSC-BS Interface (A-Interface) for Public 800 MHz*. TIA/EIA/IS-634-A. TIA/EIA Interim Standard (Revision of TIA/EIA/IS-634) Jul. 1998.
*MSC-BS Interface for Public 800 MHz*.TIA/EIA/IS-634. TIA/EIA Interim Standard, Dec. 1995.
Network Wireless Systems Offer Business Unit (NWS OBU), Feature Definition Document for Code Division Multiple Access (CDMA) Packet Mode Data Services, FDD-1444, Nov. 26, 1996.
Ott, David TR45.5, CDMA WBSS Technical Standards Meeting Summary. Feb. 24-28, 1997 Banff, Alberta.
Ovesjö Frederik, European Telecommunication Standard, SMG2 UMTS physical Layer Expert Group, "UTRA Physical Layer Descriptions FDD parts" (v0.4, Jun. 25, 1998), pp. 1-41, XP-002141421.
Packet Data Service Option Standard for Wideband Spread Spectrum Systems, TIA/EIA Interim Standard, TIA/EIA/IS-657, Jul. 1996.

*Physical Layer Standard for cdma2000 Spread Spectrum Systems, Release C*. TIA/EIA Interim Standard. TIA/EIA/IS-2000.2C. May 2002.
Preston, S., et al., "Direction Finding Using a Switched Parasitic Antenna Array," *IEEE APS International Symposium Digest*, Montreal, Canada, pp. 1024-1027, (1997).
Preston, S.L., et al., A Multibeam Antenna Using Switched Parasitic and Switched Active Elements for Space-Division Multiple Access Applications, *IEICE Trans. Electron.*, vol. E82-C, No. 7, pp. 1202-1210, (Jul. 1999).
Preston, S.L., et al., "Base-Station Tracking in Mobile Communications using a Switched Parasitic Antenna Array," *IEEE Trans. Antennas and Propagation*, vol. 46, No. 6, pp. 841-844, (Jun. 1998).
Preston, S.L., et al., "Electronic Beam Steering Using Switched Parasitic Patch Elements," *Electronics Letters*, vol. 33, No. 1, pp. 7-8, (Jan. 2, 1997).
Preston, S.L., et al., "Size Reduction of Switched Parasitic Directional Antennas Using Genetic Algorithm Optimization Techniques," *Asia Pacific Microwave Conference Proceedings*, Yokohama, Japan, pp. 1401-1404, (1998).
Preston, S.L., et al., "Systematic Approach to the Design of Directional Antennas Using Switched Parasitic and Switched Active Elements," *Asia Pacific Microwave Conference Proceedings*, Yokohama, Japan, pp. 531-534, (1998).
Puleston, PPP Protocol Spoofing Control Protocol, Global Village Communication (UK) Ltd., Feb. 1996.
Reed et al., Iterative Multiuser Detection for CDMA with FEC: Near-Single-User Performance, IEEE Transactions on Communications, vol. 46, No. 12, Dec. 1998, pp. 1693-1699.
Ruze, J., "Lateral-Feed Displacement in a Paraboloid," *IEEE Trans. Antennas and Propagation*, vol. 13, pp. 660-665, (1965).
Scott, N.L., et al., "Diversity Gain from a Single-Port Adaptive Antenna Using Switched Parasitic Elements Illustrated with a Wire and Monopole Prototype," *IEEE Trans. Antennas and Propagation*, vol. 47, No. 6, pp. 1066-1070, (Jun. 1999).
Shacham, et al., "A Selective-Repeat-ARQ Protocol for Parallel Channels and its Resequencing Analysis," IEEE Transactions on Communications, XP000297814, 40 (4): 773-782 (Apr. 1997).
Sibille, A., et al., "Circular Switched Monopole Arrays for beam Steering Wireless Communications," *Electronics Letters*, vol. 33, No. 7, pp. 551-552, (Mar. 1997).
Simpson, W. (Editor). "RFC 1661—The Point-to-Point Protocol (PPP)." Network Working Group, Jul. 1994, pp. 1-35. http://www.faqs.org/rfcs/rfc1661.html.
Simpson, W. (Editor). "RFC 1662—PPP in HDLC-Like Framing." Network Working Group, Jul. 1994, pp. 1-17. http://www.faqs.org/rfcs/rfc1662.html.
Skinner et al., Performance of Reverse-Link Packet Transmission in Mobile Cellular CDMA Networks, IEEE, 2001, pp. 1019-1023.
Stage 1 Service Description for Data Services—High Speed Data Services (Version 0.10) CDG RF 38. Dec. 3, 1996.
*Support for 14.4 kbps Data Rate and PCS Interaction for Wideband Spread Spectrum Cellular Systems*. TSB74, Dec. 1995. TIA/EIA Telecommunications Systems Bulletin.
*Telecommunications Industry Association Meeting Summary*. Task Group I, Working Group III, Subcommittee TR45.5. Feb. 24-27, 1997. Banff, Alberta.
*Telecommunications Industry Association Meeting Summary*. Task Group I, Working Group III, Subcommittee TR45.5. Jan. 6-8, 1997. Newport Beach, California.
Third Generation Partnership Project 2, "cdma2000 High Rate Packet Data Air Interference Specification," 3GPP2 C.S0024 Version 2.0 (Oct. 27, 2000).
Third Generation Partnership Project 2, "Physical Layer Standard for cdma2000 Spread Spectrum Systems," 3GPP2 C.0002-0 Version 1.0 (Jul. 1999).
Third Generation Partnership Project, "Technical Specification Group Radio Access Network; Physical Layer Procedures (FDD) (Release 1999)." 3GPP TS 25.214 v3.5.0 (Dec. 2000).
Third Generation Partnership Project, "Technical Specification Group Radio Access Network; Physical Layer Procedures (TDD) (Release 1999)," 3GPP TS 25.224 V3.6.0 (Mar. 2001).

(56) References Cited

OTHER PUBLICATIONS

Third Generation Partnership Project, "Technical Specification Group Radio Access Network; Physical Layer Procedures (TDD) (Release 1999)," 3GPP TS 25.224 V3.10.0 (Mar. 2002).
Third Generation Partnership Project, "Technical Specification Group Radio Access Networks; UE Radio Transmission and Reception (FDD) (Release 1999)," 3GPP TS 25.101 V3.6.0 (Mar. 2001).
Third Generation Partnership Project, "Technical Specification Group Radio Access Networks; UE Radio Transmission and Reception (FDD) (Release 1999)," 3GPP TS 25.101 V3.10.0 (Mar. 2002).
Third Generation Partnership Project, "Technical Specification Group Radio Access Network; Physical layer—General description (Release 1999)," 3G TS 25.201 V3.1.0 (Jun. 2000).
Third Generation Partnership Project, "Technical Specification Group Radio Access Network; Physical layer—General description (Release 1999)," 3GPP TS 25.201 V3.3.0 (Mar. 2002).
Third Generation Partnership Project, "Technical Specification Group Radio Access Network; Physical channels and mapping of transport channels onto physical channels (FDD) (Release 1999)," 3GPP TS 25.211 V3.6.0 (Mar. 2001).
Third Generation Partnership Project, "Technical Specification Group Radio Access Network, Synchronisation in UTRAN Stage 2 (Release 1999)," 3GPP TS 25.402 V3.9.0 (Mar. 2002).
Third Generation Partnership Project, "Technical Specification Group Radio Access Network; Physical channels and mapping of transport channels onto physical channels (TDD) (Release 1999)," 3G TS 25.221 V3.10.0 (Mar. 2002).
Third Generation Partnership Project, "Technical Specification Group Radio Access Network; Services provided by the physical layer (Release 1999)," 3GPP TS 25.302 V3.12.0 (Mar. 2002).
Third Generation Partnership Project, "Technical Specification Group Radio Access Network; MAC protocol specification (3G TS 25.321 version 3.2.0)," 3G TS 25.321 V3.11.0 (Mar. 2002).
Third Generation Partnership Project, "Technical Specification Group Radio Access Network; Radio Resource Management Strategies (Release 1999)," 3G TR 25.922 V3.7.0 (Mar. 2002).
Third Generation Partnership Project, "Technical Specification Group Radio Access Network; Spreading and modulation (TDD) (Release 1999)," 3GPP TS 25.223 V3.8.0 (Mar. 2002).
Third Generation Partnership Project, "Technical Specification Group Radio Access Network; Physical Layer Procedures (FDD) (Release 1999)." 3GPP TS 25.214 v3.10.0 (Mar. 2002).
Third Generation Partnership Project, "Technical Specification Group Radio Access Network; Multiplexing and channel coding (FDD) (Release 1999)," 3GPP TS 25.212 V3.5.0 (Dec. 2000).
Third Generation Partnership Project, "Technical Specification Group Radio Access Network; RRC Protocol Specification (Release 1999)," 3GPP TS 25.331 V3.10.0 (Mar. 2002).
Third Generation Partnership Project, "Technical Specification Group Radio Access Network; Requirements for support of radio resource management (FDD) (Release 1999)," 3GPP TS 25.133 V3.9.0 (Mar. 2002).
Third Generation Partnership Project, "Technical Specification Group Radio Access Networks; Requirements for Support of Radio Resource Management (FDD) (Release 1999)," 3GPP TS 25.133 V3.5.0 (Mar. 2001).
Third Generation Partnership Project, "Technical Specification Group Radio Access Network; Synchronisation in UTRAN Stage 2 (Release 1999)," 3GPP TS 25.402 V3.5.0 (Mar. 2001).
Third Generation Partnership Project, "Technical Specification Group Radio Access Network; UE Procedures in Idle Mode and Procedures for Cell Reselection in Connected Mode (Release 1999)," 3GPP TS 25.304 V3.6.0 (Mar. 2001).
Third Generation Partnership Project, "Technical Specification Group Radio Access Network; UE Procedures in Idle Mode and Procedures for Cell Reselection in Connected Mode (Release 1999)," 3GPP TS 25.304 V3.10.0 (Mar. 2002).
Third Generation Partnership Project, "Technical Specification Group Radio Access Network; RRC Protocol Specification (Release 1999)," 3GPP TS 25.331 V3.6.0 (Mar. 2001).
Third Generation Partnership Project, "Technical Specification Group Radio Access Network; Spreading and modulation (TDD) (Release 1999)," 3GPP TS 25.223 V3.5.0 (Mar. 2001).
Third Generation Partnership Project, "Technical Specification Group Radio Access Network; Physical channels and mapping of transport channels onto physical channels (FDD) (Release 1999)," 3GPP TS 25.211 V3.10.0 (Mar. 2002).
Third Generation Partnership Project, "Technical Specification Group Radio Access Network; Multiplexing and channel coding (FDD) (Release 1999)," 3GPP TS 25.212 V3.9.0 (Mar. 2002).
Third Generation Partnership Project, "Technical Specification Group Radio Access Network; Radio resource management strategies (Release 1999)," 3GPP TR 25.922 V3.5.0 (Mar. 2002).
Third Generation Partnership Project, "Technical Specification Group Radio Access Network; MAC protocol specification (Release 1999)," 3GPP TS 25.321 V3.7.0 (Mar. 2001).
Third Generation Partnership Project, "Technical Specification Group Radio Access Network; Services provided by the physical layer (Release 1999)," 3GPP TS 25.302 V3.8.0 (Mar. 2001).
TIA/EIA Interim Standard, Mobile Station-Base Station Compatibility Standard for Dual-Mode Wideband Spread Spectrum Cellular System, TIA/EIA/IS-95 (Jul. 1993).
Tsui et al., "Sensitivity of EW Receivers," Microwave Journal, vol. 25, pp. 115-117, 120 (Nov. 1982).
*Upper Layer (Layer 3) Signaling Standard for cdma2000 Spread Spectrum Systems, Release C*. TIA/EIA Interim Standard. TIA/EIA/IS-2000.5-C. May 2002.
Vaughn, R., "Switched Parasitic Elements for Antenna Diversity," *IEEE Trans. Antennas and Propagation*, vol. 47, No. 2, pp. 399-405, (Feb. 1999).
Viterbi, The Path to Next Generation Services with CDMA, Qualcomm Incorporated, 1998 CDMA Americas Congress, Los Angeles, California, Nov. 19, 1998.
Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.
www.cdg.org/news/press/1997.asp. CDA Press Release Archive, 1997.
Yang, Samuel C., "Principles of Code Division Multiple Access," in CDMA RF System Engineering, (MA: Artech House, Inc.), 1998, Chapter 4, pp. 75-103.
Non-Final Office Action for U.S. Appl. No. 08/992,759 mailed Sep. 16, 1999, 4 pages.
Non-Final Office Action for U.S. Appl. No. 08/992,759 mailed Mar. 19, 1999, 5 pages.
Final Office Action for U.S. Appl. No. 08/992,759 mailed Mar. 3, 2000, 7 pages.
Notice of Allowance for U.S. Appl. No. 08/992,759 mailed Jul. 5, 2000, 5 pages.
Final Office Action for U.S. Appl. No. 10/767,016 mailed Dec. 3, 2008, 8 pages.
Non-Final Office Action for U.S. Appl. No. 10/767,016 mailed Feb. 25, 2009, 8 pages.
Non-Final Office Action for U.S. Appl. No. 10/767,016 mailed Jan. 14, 2008, 9 pages.
Notice of Allowance for U.S. Appl. No. 10/767,016 mailed Apr. 16, 2012, 8 pages.
Notice of Allowance for U.S. Appl. No. 10/767,016 mailed Dec. 28, 2011, 8 pages.
Notice of Allowance for U.S. Appl. No. 10/767,016 mailed Sep. 20, 2011, 7 pages.
Notice of Allowance for U.S. Appl. No. 10/767,016 mailed May 27, 2011, 7 pages.
Notice of Allowance for U.S. Appl. No. 10/767,016 mailed Dec. 29, 2010, 6 pages.
Notice of Allowance for U.S. Appl. No. 10/767,016 mailed Aug. 6, 2010, 6 pages.
Notice of Allowance for U.S. Appl. No. 10/767,016 mailed Mar. 22, 2010, 6 pages.
Notice of Allowance for U.S. Appl. No. 10/767,016 mailed Nov. 30, 2009, 6 pages.
Notice of Allowance for U.S. Appl. No. 10/767,016 mailed Sep. 15, 2009, 6 pages.

(56) References Cited

OTHER PUBLICATIONS

Notice of Allowance for U.S. Appl. No. 10/767,016 mailed Sep. 25, 2007, 7 pages.
Final Office Action for U.S. Appl. No. 10/767,326 mailed Jul. 9, 2008, 8 pages.
Non-Final Office Action for U.S. Appl. No. 10/767,326 mailed Jan. 23, 2009, 8 pages.
Non-Final Office Action for U.S. Appl. No. 10/767,326 mailed Jan. 9, 2008, 8 pages.
Notice of Allowance for U.S. Appl. No. 10/767,326 mailed Dec. 16, 2010, 7 pages.
Notice of Allowance for U.S. Appl. No. 10/767,326 mailed Jul. 26, 2010, 6 pages.
Supplemental Notice of Allowance for U.S. Appl. No. 10/767,326 mailed May 20, 2010, 3 pages.
Notice of Allowance for U.S. Appl. No. 10/767,326 mailed Apr. 28, 2010, 6 pages.
Notice of Allowance for U.S. Appl. No. 10/767,326 mailed Dec. 23, 2009, 9 pages.
Notice of Allowance for U.S. Appl. No. 10/767,326 mailed Sep. 18, 2009, 6 pages.
Notice of Allowance for U.S. Appl. No. 10/767,326 mailed May 14, 2009, 8 pages.
Notice of Allowance for U.S. Appl. No. 10/767,326 mailed Oct. 30, 2007, 4 pages.
Notice of Allowance for U.S. Appl. No. 10/767,326 mailed Jul. 19, 2007, 6 pages.
Notice of Allowance for U.S. Appl. No. 10/767,326 mailed Mar. 6, 2007, 4 pages.
Notice of Allowance for U.S. Appl. No. 10/767,326 mailed Aug. 30, 2006, 6 pages.
Corrected Notice of Allowance for U.S. Appl. No. 10/767,326 mailed Apr. 28, 2006, 2 pages.
Notice of Allowance for U.S. Appl. No. 10/767,326 mailed Apr. 20, 2006, 3 pages.
Supplemental Notice of Allowance for U.S. Appl. No. 10/767,326 mailed Apr. 5, 2006, 2 pages.
Supplemental Notice of Allowance for U.S. Appl. No. 10/767,326 mailed Jan. 30, 2006, 4 pages.
Non-Final Office Action for Reexamination U.S. Appl. No. 90/008,990 mailed Feb. 25, 2009, 14 pages.
Final Office Action for Reexamination U.S. Appl. No. 90/008,990 mailed Jun. 12, 2009, 16 pages.
Advisory Action for Reexamination U.S. Appl. No. 90/008,990 mailed Aug. 31, 2009, 4 pages.
Notice of Intent to Issue a Reexamination Certificate for Reexamination U.S. Appl. No. 90/008,990 mailed Feb. 3, 2010, 4 pages.
Notice of Intent to Issue a Reexamination Certificate for Reexamination U.S. Appl. No. 90/008,990 mailed Oct. 4, 2011, 3 pages.
Newton's Telecom Dictionary, 691 (2004), 3 pages.
Office Action for Canadian Patent Application No. 2,581,871 mailed Jan. 28, 2011, 3 pages.
Office Action for Canadian Patent Application No. 2,581,871 mailed Oct. 19, 2011, 4 pages.
Office Action for Canadian Patent Application No. 2,581,871 mailed Apr. 18, 2013, 4 pages.
International Search Report for PCT/US1999/011625 mailed Nov. 15, 1999, 2 pages.
Office Action for Japanese Patent Application No. 2007-096292 mailed May 29, 2012, 6 pages.
Decision to Grant for Japanese Patent Application No. 2007-096292 mailed Oct. 16, 2012, 9 pages.
Office Action for Japanese Patent Application No. 2009-187993 mailed Apr. 27, 2012, 4 pages.
Office Action for Japanese Patent Application No. 2009-187993 mailed Jan. 15, 2013, 4 pages.
Office Action for Japanese Patent Application No. 2010-116275 mailed Jan. 20, 2012, 4 pages.
Office Action for Japanese Patent Application No. 2010-116275 mailed May 29, 2012, 4 pages.
International Search Report for PCT/US2002/001512 mailed Jun. 13, 2002, 1 page.
International Preliminary Examination Report for PCT/US2002/001512 mailed Jan. 21, 2003, 3 pages.
European Search Report for European Patent Application No. 08161008.1 mailed Sep. 17, 2008, 7 pages.
Office Action for European Patent Application No. 08161008.1 mailed Feb. 5, 2013, 3 pages.
Office Action for European Patent Application No. 08161008.1 mailed Jul. 12, 2011, 4 pages.
Office Action for European Patent Application No. 08161008.1 mailed Jan. 27, 2010, 5 pages.
Office Action for European Patent Application No. 10181171.9 mailed Nov. 3, 2011, 5 pages.
International Search Report for PCT/US1998/012875 mailed Dec. 17, 1998, 3 pages.
Melanchuk, T. et al. "CDPD and Emerging Digital Cellular Systems." Digest of Papers of COMPCON (Computer Society Conference) 1996, Technologies for the Information Superhighway, Santa Clara, Feb. 25-28, 1996, pp. 2-8.
Official Action for Norwegian Patent Application No. 20083653 mailed Oct. 8, 2014, 2 pages.
Examination Report for European Patent Application No. 11162402.9, mailed Oct. 22, 2014, 5 pages.
Notice of Allowance for European Patent Application No. 10180797.2, mailed Mar. 22, 2016, 7 pages.
"Office Action for Canadian Patent Application No. 2,882,928, mailed Mar. 24, 2016, 3 pages."
Examination Report for European Patent Application No. 10181171.9 mailed Apr. 29, 2015, 3 pages.
Notification of Grant for Norwegian Patent Application No. 20083653 mailed May 15, 2015, 4 pages.
Examination Report for European Patent Application No. 11156846.5 mailed May 7, 2015, 8 pages.
Notice of Intention to Grant for European Patent Application No. 11162402.9, mailed Sep. 2, 2015, 6 pages.
Notice of Reasons for Rejection for Japanese Application No. 2012-186900, mailed Oct. 6, 2015, 2 pages.
Notice of Allowance for Japanese Patent Application No. 2012-186900, mailed Feb. 16, 2016. No English translation available, 2 pages.
Intention to Grant for European Patent Application No. 08161008.1, mailed Oct. 23, 2015, 30 pages.

* cited by examiner

MULTI-DETECTION OF HEARTBEAT TO REDUCE ERROR PROBABILITY

CLAIM OF PRIORITY

This application is a continuation of U.S. application Ser. No. 12/165,422 filed Jun. 30, 2008, which is a continuation of U.S. application Ser. No. 10/171,378 filed Jun. 12, 2002, now U.S. Pat. No. 7,394,791 which issued on Jul. 1, 2008, which claims the benefit of U.S. Provisional Application No. 60/378,903 filed May 7, 2002 and U.S. Provisional Application No. 60/378,697 filed May 7, 2002, and U.S. Provisional Application No. 60/297,925 filed Jun. 13, 2001 and U.S. Provisional Application No. 60/297,987 filed Jun. 13, 2001; U.S. application Ser. No. 10/171,378 is a continuation-in-part of U.S. application Ser. No. 09/775,305 filed Feb. 1, 2001, now U.S. Pat. No. 7,079,523 which issued on Jul. 18, 2006, which claims the benefit of U.S. Provisional Application No. 60/180,598 filed Feb. 7, 2000; U.S. application Ser. No. 10/171,378 is a continuation-in-part of U.S. application Ser. No. 09/997,621 filed Nov. 29, 2001, now U.S. Pat. No. 6,678,260 which issued on Jan. 13, 2004, which is a continuation of U.S. application Ser. No. 09/730,376 filed Dec. 5, 2000, now U.S. Pat. No. 6,707,804 which issued on Mar. 16, 2004, which is a continuation of U.S. application Ser. No. 09/088,413 filed Jun. 1, 1998, now U.S. Pat. No. 6,222,832 which issued on Apr. 24, 2001, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to multi-detection of heartbeat to reduce error probability.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Increasing use of wireless telephones and personal computers has led to a corresponding increase in demand for advanced telecommunication services that were once thought practical only for specialized applications. In the 1980s, wireless voice communications became widely available through cellular telephone networks. Such services were thought at first to be for the exclusive province of businessmen because of expected high subscriber costs. The same was also true for access to remotely distributed computer networks, whereby until very recently, only business people and large institutions could afford the necessary computers and wireline access equipment.

As a result of the widespread availability of affordable new technologies, the general population now increasingly desires to have not only wireline access to networks such as the Internet and private intranets, but also wireless access as well. Wireless technology is particularly useful to users of portable computers, laptop computers, hand-held personal digital assistants and the like who prefer access to such networks without being tethered to a telephone line.

There still is no widely available satisfactory solution for providing low cost, high speed access to the Internet, private intranets, and other networks using the existing wireless infrastructure. This is most likely an artifact of several unfortunate circumstances. First, the typical manner of providing high speed data service in the business environment over a wireline network is not readily adaptable to the voice grade service available in most homes or offices. For example, such standard high speed data services do not necessarily lend themselves to efficient transmission over standard cellular wireless handsets because wireless networks were originally designed only to provide voice services. As a result, present day digital wireless communications systems are optimized for voice transmissions, although certain schemes such as CDMA do provide some measure of asymmetrical behavior for the accommodation of data transmissions. For example, the data rate specified by the Telecommunication Industry Association (TIA) for IS-95 on the forward traffic channel is adjustable in increments from 1.2 kbps up to 9.6 kbps for so-called Rate Set 1, and increments from 1.8 kbps up to 14.4 kbps for Rate Set 2. On the reverse link traffic channel, however, the data rate is fixed at 4.8 kbps.

At best, existing wireless systems therefore typically provide a radio channel that can accommodate maximum data rate transfers of 14.4 kilobits per second (kbps) over a forward link direction. Such a low data rate channel does not lend itself directly to transmitting data at rates of 28.8 or even 56.6 kbps that are now commonly available using inexpensive wireline modems, not to mention even higher rates such as the 128 kbps that are available with Integrated Services Digital Network (ISDN) type equipment. Data rates at these levels are rapidly becoming the minimum acceptable rates for activities such as browsing web pages.

Although wireline networks were known at the time when cellular systems were initially developed, for the most part, there was no provision made for such wireless systems to provide higher speed ISDN- or ADSL-grade data services over cellular network topologies.

In most wireless systems, there are many more potential users than radio channel resources. Some type of demand-based multiple access system is therefore required.

Whether the multiple access is provided by the traditional Frequency Division Multiple Access (FDMA) using analog modulation on a group of radio frequency carrier signals, or by schemes that permit sharing of a radio carrier frequency using Time Division Multiple Access (TDMA), or Code Division Multiple Access (CDMA), the nature of the radio spectrum is such that it is expected to be shared. This is quite dissimilar to the traditional environment supporting data transmissions in which the wireline medium is relatively inexpensive and is not typically intended to be shared.

Other factors to consider in the design of a wireless system are the characteristics of the data itself. For example, consider that access to web pages generally is burst-oriented, with asymmetrical data rate transmission requirements in a reverse and forward direction. In a common application, a user of a remote client computer first specifies the address of a web page to a browser program. The browser program then sends the web page address data, which is usually 100 bytes or less in length, over the network to a server computer. The server computer then responds with the content of the requested web page, which may include anywhere from 10 kilobytes to several megabytes of text, image, audio, or even video data. The user thereafter may spend several seconds or even several minutes reading the content of the page before downloading another web page.

In an office environment, the nature of most employees' computer work habits is typically to check a few web pages and then to do something else for an extended period of time, such as accessing locally stored data or even terminating use of the computer altogether. Therefore, even though such users may remain connected to the Internet or private intranet continuously during an entire day, actual use of the high speed data link is usually quite sporadic.

If wireless data transfer services supporting Internet connectivity are to coexist with wireless voice communication, it is becoming increasingly important to optimize the use of available resources in wireless CDMA systems. Frequency re-use and dynamic traffic channel allocation address some aspects of increasing the efficiency of high performance wireless CDMA communication systems, but there is still a need for more efficient utilization of available resources.

SUMMARY OF THE INVENTION

One way of making more efficient utilization of available resources is to ensure the resources are allocated in an error-free manner. For example, a base station should not allocate traffic channels to a field unit when a request for traffic channels has not been made. Similarly, the base station should allocate traffic channels to a field unit when a request has been made. Such a request is made by the field unit when the field unit is employed by a user to send traffic data to a remote network node.

In one application, a transmission of a marker in a time slot over one channel indicates a request by the corresponding field unit to go active. That is, transmission of a marker in an assigned time slot indicates that the field unit is requesting that reverse link traffic channels be assigned to the user for transmitting a data payload from the field unit to the base station. This presumes that the field unit is presently in the standby mode. Alternatively, a field unit transmits a marker over a second channel of the pair of reverse link channels to indicate that the field unit is not requesting to be placed in the active mode. For example, the field unit does not want to transmit data on a reverse link channel. Rather, the field unit requests to remain inactive but synchronized with the base station so that the field unit can immediately go active again at any moment.

In either case, the present invention improves performance for detecting a signal having a marker, or indication, of a request to change communications states, for example, by making a measurement of the indications to determine that a request to change communications states has been made. In one particular embodiment, the measurement includes at least two positive identifications of the request in a given time span. The system may further improve performance by applying a difference in power levels for a non-request state (i.e., steady state or 'control hold' state) versus a request state (i.e., 'request to change' communications state). The result may include a reduced number of erroneous communications states, such as erroneously assigned or allocated traffic channels.

In one particular application, a subscriber unit provides a heartbeat channel using a first code in a CDMA system in a heartbeat with request channel using a second code in the reverse link to a base station. The subscriber unit provides the signal(s) with a repetition and, optionally, different power levels in a manner that a base station employing the principles of the present invention determines a request to change communications states with a reasonably high probability of detection and a reasonably low probability of false detection.

The teachings of the present invention are compatible with 1xEV-DV systems and I-CDMA systems, but general enough to support systems employing various other communications protocols used in wired and wireless communications systems. Code Division Multiple Access (CDMA) systems, such as IS-2000, and Orthogonal Frequency Division Multiplexing (OFDM) systems, such as IEEE 802.11a wireless local area network (LAN), may employ an embodiment of the present invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The cost of missed or erroneous detection of Heartbeat (HB) and Heartbeat with Request to Go Active (HB/RQST) signals is costly. If a false detection occurs for HB, power control commands and timing commands used between a base station and field terminal may be generated based on a received code phase that is not correct. Thus, the power control can be erroneous and not based on the actual received power from the terminal. For the request message, resources will be assigned to a user when the resources are not needed, which results in wasted capacity.

Traditionally, if a very low probability of false detection is important, a requirement of a very high Eb/No (i.e., energy-per-bit per noise density) threshold at the Base Transceiver Station (BTS) is imposed. As an alternative, if the speed of detection is less important, as in the case of the HB signal, multiple successive detections may be useful. This allows the probability of false detection to be greatly reduced.

For instance, if the P(fd)=0.01 and if three detections in a row is specified to be made before a "Valid Detection" is determined, the overall P(fd)=(0.01)^3 or 0.000001. This is less costly for detection as the probability is much higher to start with. For instance, if the single detection probability is 0.9, requiring three detections lowers the detection probability to 0.9^3 or 0.72, only a slight reduction. This technique is known in radar systems, but has not been used in this application for detecting HB and HB/RQST signals and other communications systems and applications. It should be understood that the HB and HB/RQST signals are examples of signals to which the teachings of the present invention may be applied and not intended to be limiting in any way.

The signals to be detected and counted (i) may be successive—either in time or by user allocated slot in a TDMA system, for example—or (ii) may have breaks between the signals but have a given number of pulses, bits, or other indicators in a given time interval. For a CDMA reverse link, requiring multiple serial detections or non-serial detections may be used to qualify as a system level detection. Further, the system may set a different power control target versus a detection target, which means that for a lower transmission power, integration time is increased to increase energy for detection. For a system that uses time slots, the system may include intelligence to monitor successive or non-successive time slots for the given user. In addition, the system works on gated and non-gated signals.

The interference level of the heartbeats is derived as a classical RADAR detection problem. To this end, the benefits are made possible based on the heartbeat pulses being "detected" rather than being demodulated as in the case with the Dedicated Control Channel (DCCH) and Slotted Control Hold Mode (DCHM) in CDMA technology.

Figure 1:
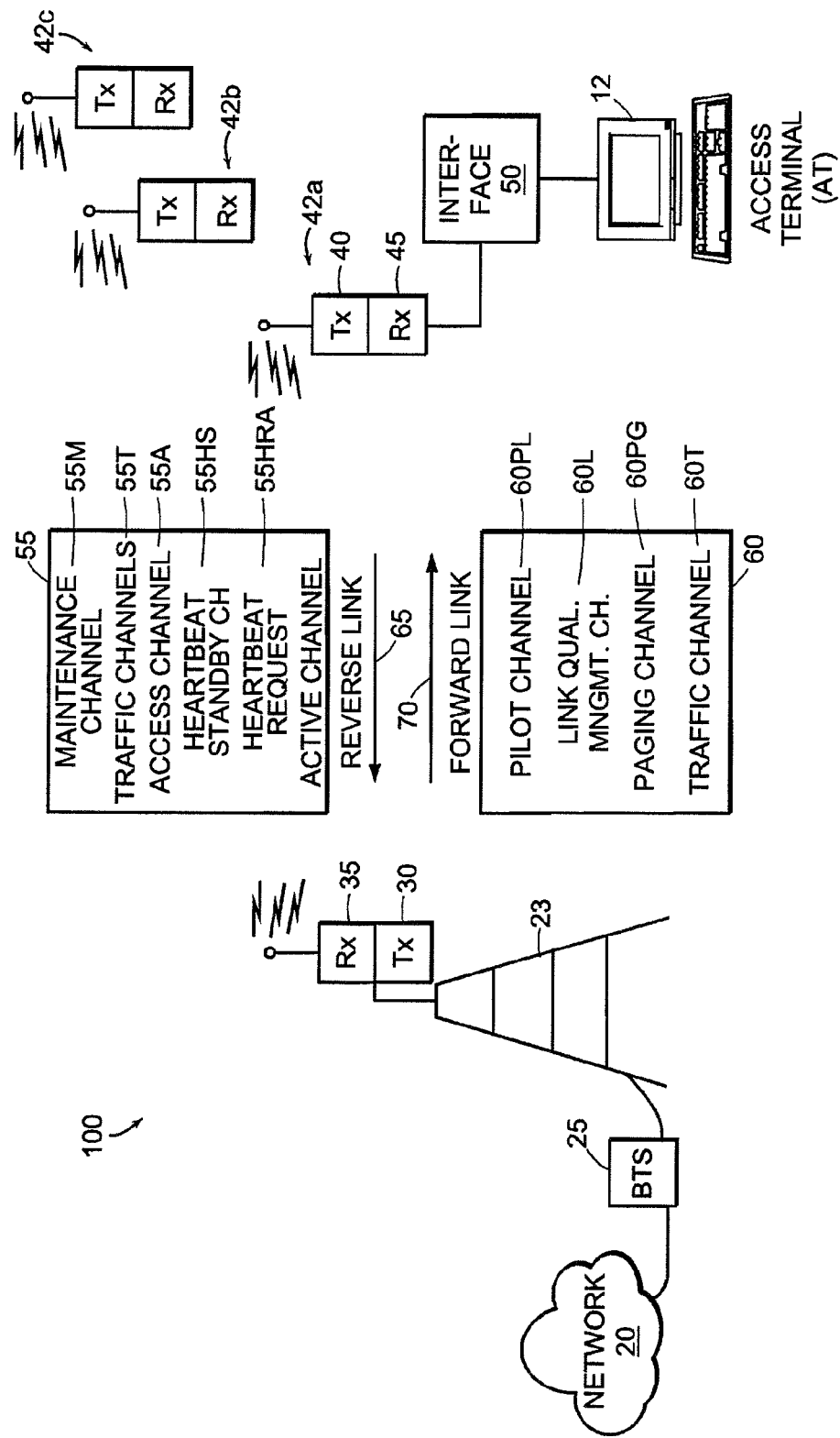
FIG. 1 is a schematic diagram of a communications system in which in an embodiment of the present invention may be deployed.

FIG. 1 is a diagram of an example communications system 100, similar to the system described above, employing an embodiment of the present invention. A base transceiver station (BTS) 25 with antenna tower 23 maintains wireless communications links with each of a plurality of field units 42a, 42b, 42c (collectively, field units 42) as shown. Such wireless links are established based upon assignment of resources on a forward link 70 and a reverse link 65 between the base station 25 and field units 42. Each link 65 or 70 is typically made up of several logical reverse link channels 55 and several logical forward link channels 60, respectively.

As shown, the communications system 100 supports wireless communications between an interface 50 and a network 20. Typically, the network 20 is a Public Switched Telephone Network (PSTN) or computer network, such as the Internet, internet, or intranet. The interface 50 is preferably coupled to a digital processing device, such as a portable computer 12, sometimes referred to as an access unit, to provide wireless access to the network 20. Consequently, the portable computer 12 has access to the network 20 based on communications over a combination of both hard-wired and wireless data links.

In a preferred embodiment, the forward link channels 60 and reverse link channels 55 are defined in the communications system 100 as Code Division Multiple Access (CDMA) channels. That is, each CDMA channel is preferably defined by encoding and transmitting data over the channel with an augmented pseudo random noise (PN) code sequence. The PN coded data is then modulated onto a radio frequency carrier. This enables a receiver to decipher one CDMA channel from another knowing only the particular augmented PN code assigned for a given channel. In accordance with an embodiment, each channel preferably occupies a 1.25 MHZ band consistent with the IS-95 CDMA standard or 1xEV-DV standard and is capable of transmitting at 38.4 kbps.

A forward link 70 includes at least four, logical, forward link channels 60. As shown, this includes a Pilot Channel 60PL, Link Quality Management (LQM) channel 60L, paging channel 60PG and multiple traffic channels 60T.

The reverse link 65 includes at least five logical channels 55. As shown, this includes a heartbeat standby channel 55HS, heartbeat request active channel 55HRA, access channel 55A and multiple traffic channels 55T. Generally, the reverse link channels 55 are similar to the forward link channels 60 except that each reverse link traffic channel 60T can support variable data rates from 2.4 kbps to a maximum of 160 kbps.

Data transmitted between the base station 25 and field unit 42a typically include encoded digital information, such as web page data. Based on the allocation of multiple traffic channels in the reverse link 65 or forward link 70, higher data transfer rates can be achieved in a particular link between the base station 25 and field unit 42a. However, since the field units 42 compete for bandwidth allocation, a field unit 42a may have to wait until resources are free to be assigned traffic channels to transmit a data payload.

Before discussing an example detector system (FIG. 2) that can be used to distinguish a heartbeat from a heartbeat-with-request signal, a brief discussion of example signals will be discussed in reference to FIGS. 3A-3C.

Figure 3A:
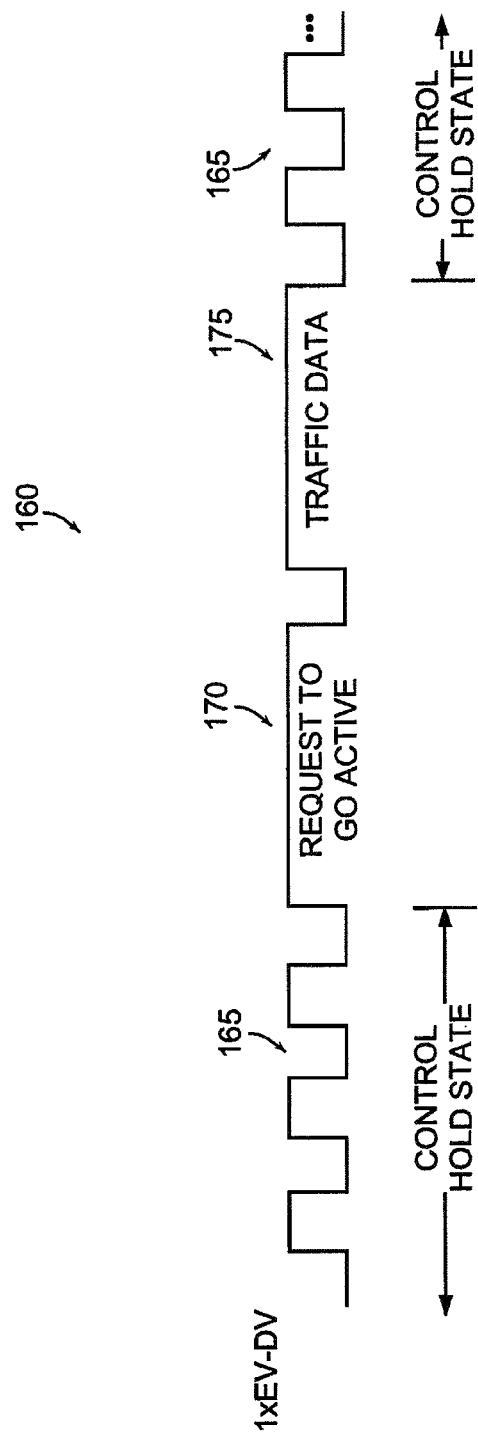
FIG. 3A is a signal diagram of a 1xEV-DV signal with a first marker indicating 'control hold' and a second marker indicating a 'request to go active'.

In FIG. 3A, a 1xEV-DV signal 160 that may be transmitted by the field unit is shown having three distinct states: a 'control hold' state 165, a 'request to go active' state 170, and a data traffic state 175. In the 'control hold' state 165, the signal 160 does not include a 'request to go active' indication. In other words, the signal 160 remains in an 'idle' or 'control hold' state, which indicates that the field unit 42a is not requesting traffic channels. The 'request to go active' state 170 is an indication that the field unit is requesting to transmit data on a traffic channel over a reverse link to the BTS 25. In the traffic state 175, traffic data is transmitted by the field unit to the BTS. Following transmission of the traffic data over the reverse link, the signal 160 reverts back to the 'control hold' state 165 following a transmission of a 'data transmission complete' state (not shown).

Although shown as a single signal 160, it should be understood that the signal may be multiple signals, optionally coded with orthogonal or non-orthogonal codes into mutually exclusive channels. For example, the 'control hold' state 165 may be transmitted on a different channel from the 'request to go active' state 170. Similarly, the traffic data transmitted in a transmit state 175 may be on a separate channel from the other two states 165, 170. An example of multiple channel is discussed in reference to FIGS. 3B and 3C.

Figure 3B:
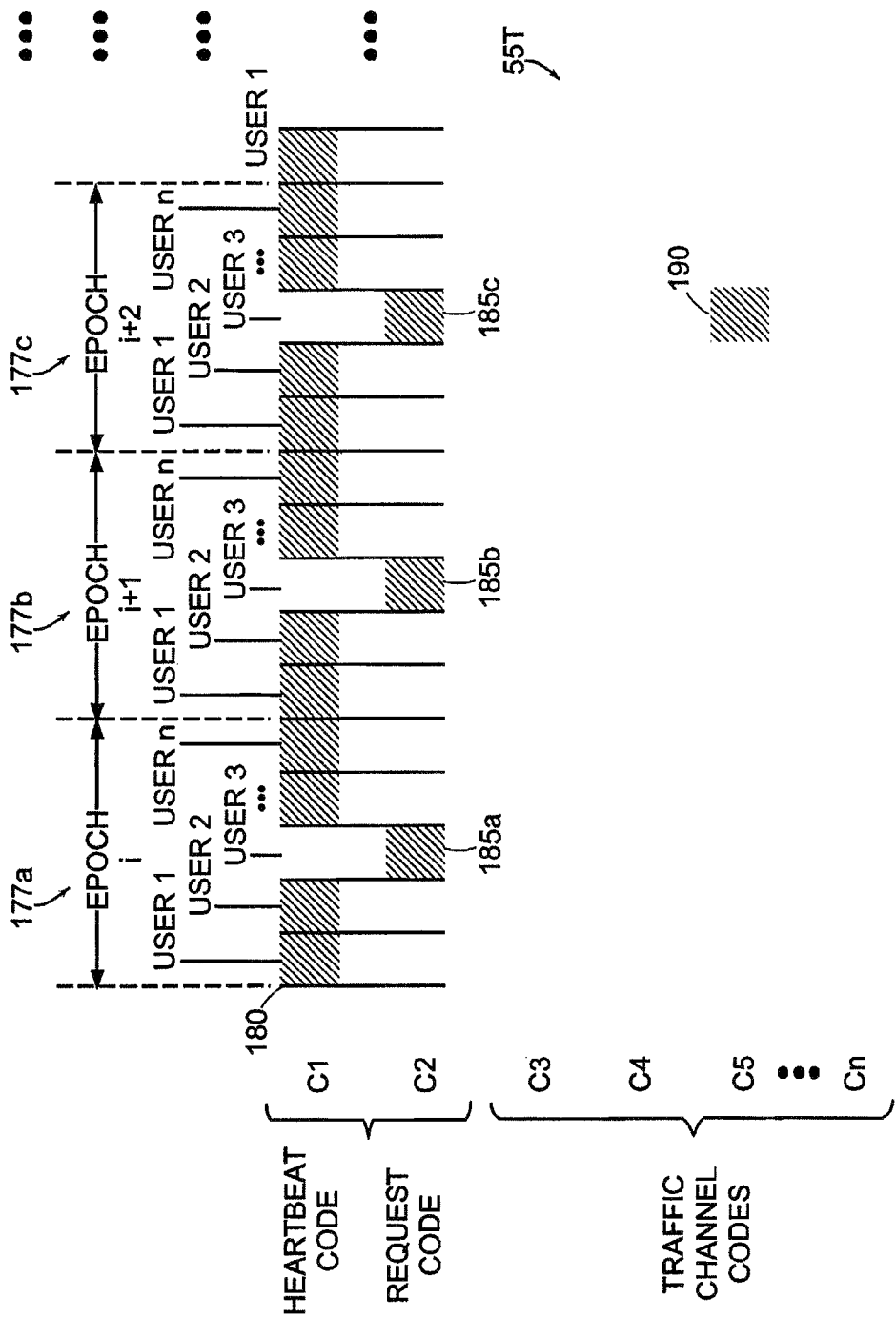
FIG. 3B is a signal diagram of a code division multiple access (CDMA) set of code channels having a marker in an assigned time slot that indicates that the field unit is requesting a change in communications states.

FIG. 3B is an example of an Internet code division multiple access (I-CDMA) signaling diagram that has assigned time slots for users 1, 2, 3, . . . , N repeating in epoch i 177a, epoch i+1 177b, and so forth. The channels are composed of the heartbeat channel 55H, request channel 55R, and traffic channels 55T. Each of these channels has an associated code C1, C2, C3, C4, . . . , CN, which allow signals to be transmitted on mutually exclusive code channels. Both the transmitting and receiving systems process the information in the channels by using the codes to separate the information respectively included therein in a typical CDMA manner.

In the example shown, users 1, 2, 4, 5, 6, . . . , N are requesting to remain in an idle state, indicated by the presence of a signal 180 in the heartbeat channel 55H. User 3, however, is requesting to transmit data over a reverse link based on a signal 185 in the request channel 55R in the first epoch 177a, a signal 185b in the request channel 55R in the second epoch 177b, and possibly additional epochs. In the third epoch 177c, the BTS 25 has detected the request to transmit data based on the two consecutive indications 185a and 185b. Following receipt of an acknowledgment, user 3 begins to transmit traffic data 190 in an associated traffic channel using code C5. In an alternative embodiment, the BTS 25 may require three consecutive indications 185a through 185c before determining that a request is being made and acknowledging same.

Figure 3C:
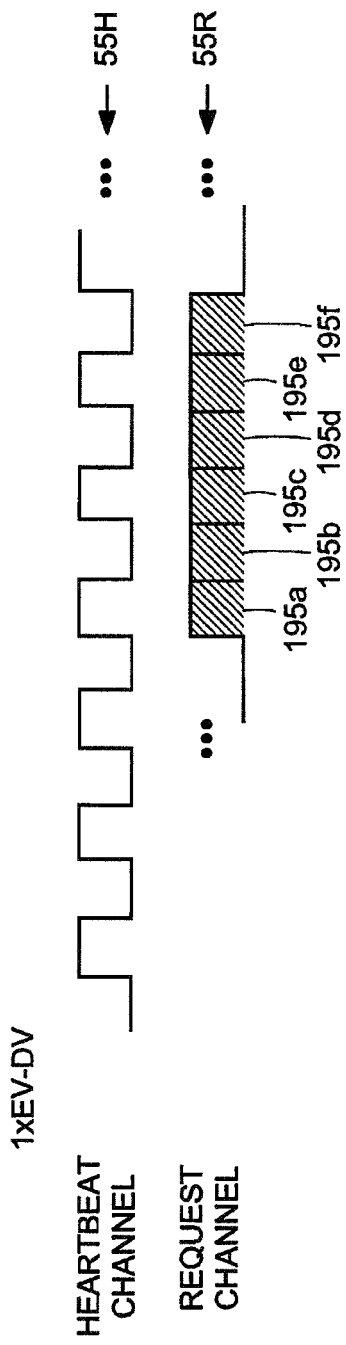
FIG. 3C is a signal diagram of an alternative embodiment of a reverse link signal having the indications.

FIG. 3C is a more detailed signal diagram of the 1xEV-DV signal of FIG. 3A that is used to indicate a 'request to go active' to the base station 25 from the field unit 42a. In this embodiment, the 1xEV-DV signal is composed of multiple signals on different logical channels: a heartbeat channel 55H and a request channel 55R. The heartbeat channel 55H provides continuous timing and other information (e.g., power level, synchronization, etc.) from the field unit 42a to the base station 25. The field unit 42a uses the request channel 55R to make a request (e.g., digital "1") of the base station 25 to request a traffic channel on the reverse link 65 for transmitting data.

Sampling times 195a, 195b, . . . , 195f (collectively 195) denoted by arrows indicate times or intervals at which the BTS 25 samples the time slots of the request signal 55R and, optionally, the heartbeat channel 55H to determine whether a request for a traffic channel is being made. It should be understood that the sampling may occur over the entire time slot or a subset thereof. Also, the heartbeat channel 55H and request channel 55R use mutually exclusive codes, in this particular embodiment, so the sampling is performed on their mutually exclusive code channels 55H, 55R in all or a subset of time slots. In one particular embodiment, the base station 25 samples mutually exclusive code channels 55H, 55R in time slots designated for request indications, such as in time slots at sampling times 195b, 195d, and 195f. During these time slots, the heartbeat channel 55H is "inactive", but the request channel 55R is "active".

As discussed above, the signals in the "active" request time slots may be modulated messages or simply coded pilot signals with no "bits". Thus, detection may be based solely on the respective energy levels of the heartbeat and heartbeat-with-request signals in respective time slots over a given time interval or spanning several time intervals.

In one particular embodiment, the 'control hold' state 165 indication has a first energy level, and the 'request to go active' state 170 has a second energy level. The base station 25 may take advantage of the difference in power levels in addition to the repetition of the pulses used to indicate a request to go active. For example, in this particular embodiment, distinguishing the two states may be a matter of measuring energy levels of the signals(s) and (i) comparing the energy levels against at least one threshold or (ii) determining that a request is present, optionally in a mutually exclusive code channel in time slots when the heartbeat signal is at a logical zero. The different energy levels of the indications may be provided by the duty cycle of the signals, frequency of the signals, power of the signals, signaling structure, and so forth.

Figure 4:
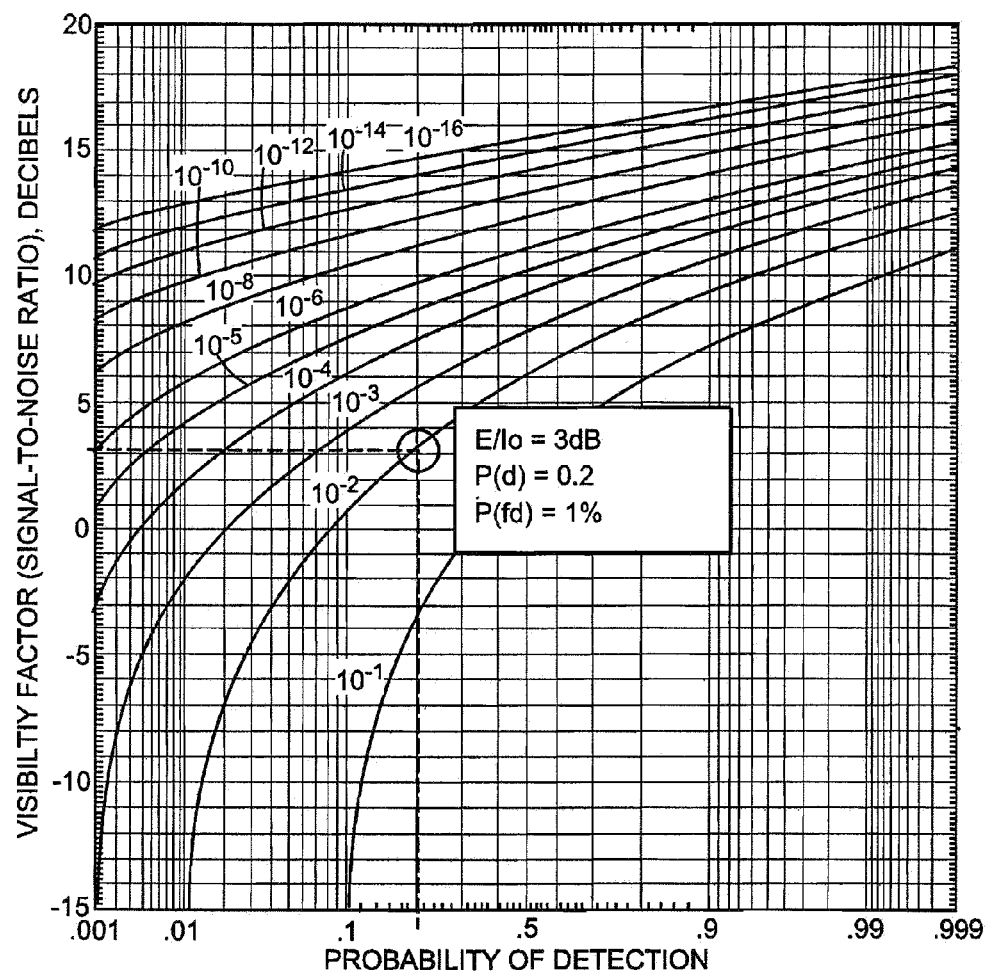
FIG. 4 is a plot of signal-to-noise ratio versus probability of detection that may be used in determining energy levels of the indications in the signals of FIGS. 3A-3C.

To understand how the energy levels of the signals can be used to improve system performance, on can refer to FIG. 4, which provides a chart for selecting signaling requirements based on the following parameters or factors: (i) probability of detection, P(d)(x-axis), (ii) signal-to-noise ratio in decibels (y-axis), and (iii) probability of false detection, P(fd) (curves in the chart). This chart shows a required signal-to-noise ratio at the input terminals of a linear-rectifier detector as a function of probability of detection for a single pulse, with the false-alarm probability P(fd) as a parameter, calculated for a non fluctuating signal. It should be understood that alternative parameters or factors may be used to establish or define the transmitted power levels of the indications.

At the circled point 200, the signal-to-noise ratio is 3 dB, P(d)=20%, and P(fd)=1%. To increase the probability of detection for the same probability of false detection, one simply needs to slide the circled point 200 upward along the same probability of false detection curve, which suggests that an increase in the signal-to-noise ratio is used to improve system performance and, thus, improving the likelihood that the request signal will be detected quickly.

Before providing an example model and discussion regarding example Heartbeat standby 55HS and Heartbeat Request Active 55HRA energy levels for the example communications system 100 (FIG. 1), a brief discussion of a processor and detector that may be used in the system is now provided.

Figure 2A:
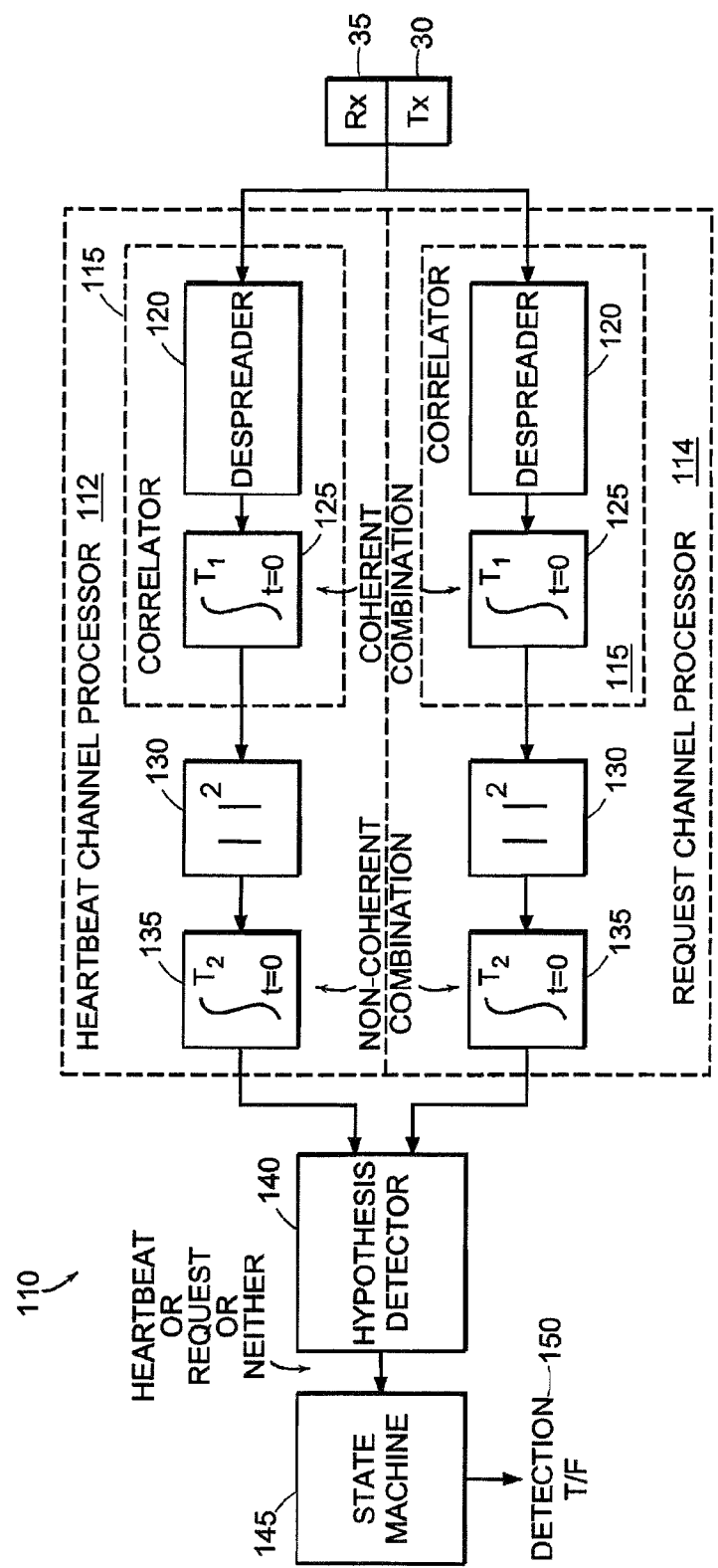
FIG. 2A is a schematic diagram of a subsystem employed by a base station in the communications system of FIG. 1 used to determine whether a reverse link signal includes an indication for a request to change communications states.

FIG. 2A is a schematic diagram of a request detection processor 110 used to determine whether the field unit 42a has requested to send data to the BTS 25. The receiver Rx 35 receives signals 55, which includes the maintenance channel 55M, traffic channels 55T, access channel 55A, heartbeat standby channel 55HS, and heartbeat request active channel 55HRA. The signal 55 is processed such that a heartbeat channel processor 112 receives the heartbeat standby channel 55HS and a request channel processor 114 receives the Heartbeat Request Active channel 55HRA.

The heartbeat channel processor 112 and request channel processor 114 include the same processing elements, in this particular embodiment, so a discussion of just the heartbeat channel processor 112 will be provided for brevity.

The heartbeat channel processor 112 receives the heartbeat standby channel 55HS. A correlator 115 uses a despreader 120 to despread the heartbeat standby channel 55HS. An integrator 125 is used to coherently combine the heartbeat signal. By coherently combining the signal, an integration of I, Q and its phase causes the phase of the signal to be removed and output the power of the signal.

Following the correlator 115, a rectifier 130 (i.e., absolute value of the signal squared) rectifies the power of the signal, which is then integrated by a second integrator 135 to calculate the energy of the received heartbeat signal. The second integrator 135 provides non-coherent combination of the signal, which is calculated over short time intervals. The non-coherent integration provides just magnitudes if the terminal is moving too fast, thus causing a cross-over of the 180-degree phase point, which can cause ambiguities in determining the energy of the signal in the absence of the non-coherent combination.

The output from the heartbeat channel processor 112 is a heartbeat energy level, and the output from the request channel processor 114 is a request energy level. Each of these energy levels, in this particular embodiment, is fed to a hypothesis detector 140, which determines whether a heartbeat signal, request signal, or neither signal is in the signal 55 received by the base station 25.

The output from the hypothesis detector 140 is provided to a state machine 145. The state machine is used to determine whether the field unit is making a 'request to go active' according to a given criteria, where, in one particular embodiment, is a measurement of the output from the hypothesis detector 140. Example measurements include counting the number of consecutive request signals, measuring a ratio of heartbeat standby channel signals and heartbeat request active channel signals, counting heartbeat request active signals in a given time span, and so forth. Further, the hypothesis detector 140 and the difference in energy levels of the indications improves system performance, but are not required for the present invention. In other words, the heartbeat standby channel 55HS and heartbeat request active channel 55HRA may be processed directly by the state machine 145 to determine whether the field unit 42a is requesting to go active. More detail is provided following a description of an embodiment of the state machine 145.

In this particular embodiment, the state machine 145 outputs a Boolean true or false signal. An example of a process executed by the state machine is depicted in FIG. 2B.

Figure 2B:
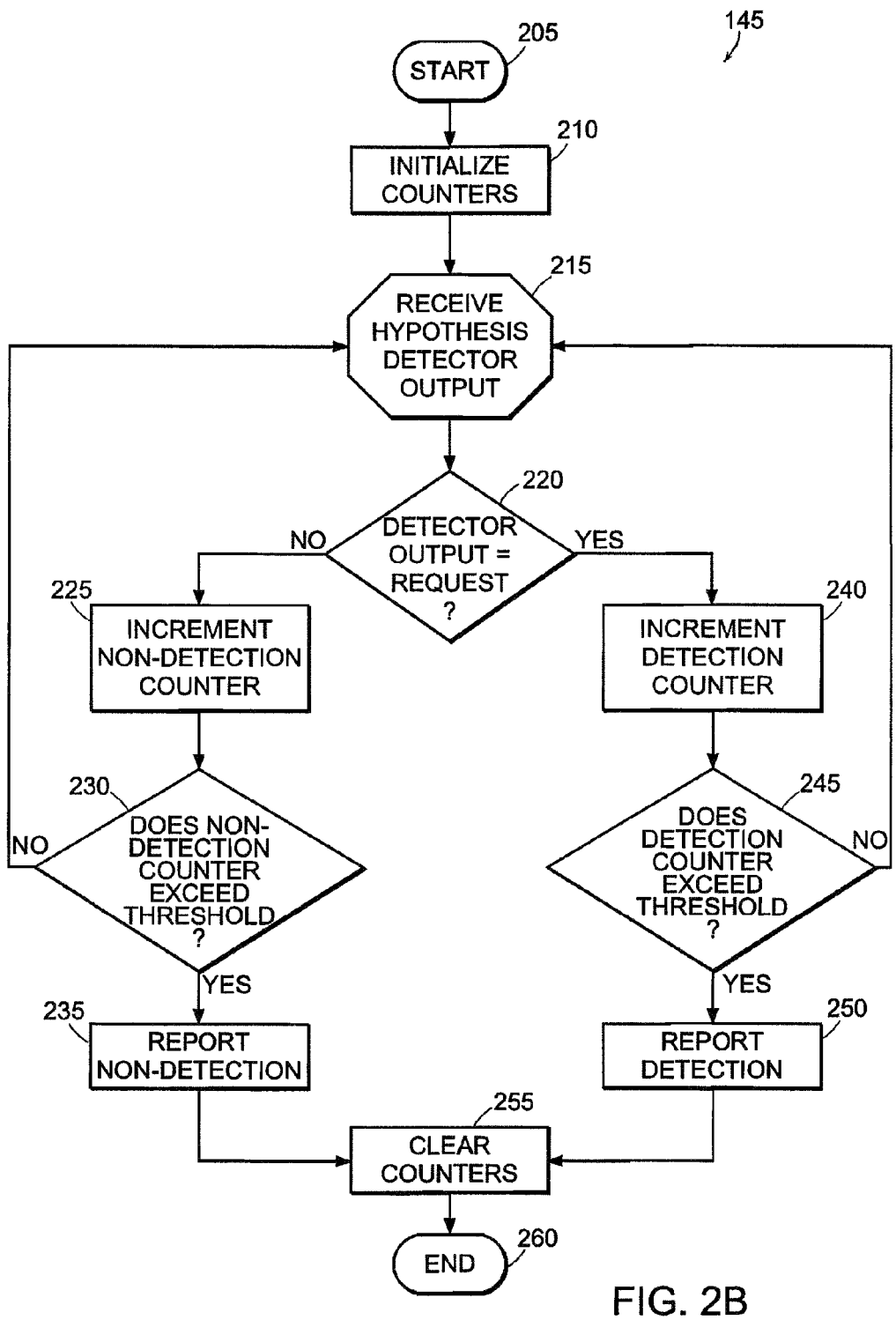
FIG. 2B is a flow diagram of a process executed by a state machine in the subsystem of FIG. 2A.

FIG. 2B is an example flow diagram of the state machine 145. The example state machine 145 starts in step 205 when the detection processor 110 "boots up." In step 210, the state machine 145 initializes counters that are used to determine if a detection has occurred. In step 215, the state machine 145 receives the output from the hypothesis detector 140. After boot up, the state machine 145 may act as an 'interrupt service routine', beginning in step 215, upon receipt of any output from the hypothesis detector 140. The counters are cleared (i.e., set to zero) upon a determination of a detection or a non-detection to reset the measurement process without are-boot of the detection processor 110, as discussed below.

Following receipt of the output from the hypothesis detector 140 in step 215, the state machine 145 determines whether the output of the hypothesis detector 145 is a request (i.e., 'request to go active'). If yes, then the state machine 145 continues in step 240 in which a detection counter is incremented. In step 245, the detection counter is compared against a threshold. If the detection counter exceeds the threshold, then, in step 250, the state machine 145 reports a detection of a 'request to go active' from the field unit 42a. If the detection counter does not exceed the threshold, then the state machine 145 returns to step 215 and waits to receive another output from the hypothesis detector 140.

Continuing to refer to FIG. 2B, if, in step 220, the output of the hypothesis detector 140 is determined not to be a 'request', then the state machine 145 continues in step 225. In step 225, the state machine 145 increments a non-detection counter. In step 230, a determination is made as to whether the non-detection counter exceeds a threshold. If yes, then the state machine 145 continues in step 235, in which the state machine 145 reports a non-detection of a 'request to go active' by the field unit 42a. If the non-detection counter does not exceed the threshold, then the state machine 145 continues in step 215.

Following steps 235 and 250, the state machine 145 clears the counters in step 255, allowing the state machine 145 to detect future 'requests to go active' by the field unit 42a. In step 260, the state machine 145 ends.

The detection counter is used by the state machine 145 to determine how many indications of a 'request to go active' have been received by the detection processor 110 according to a given criteria. The criteria can be of any form, including a given number of consecutive detections, a given number of detections in a given time span, or a ratio of detections to non-detections. Alternative non-counting based measurements may be employed to determine whether a request is being made to go active, such as measuring the phase of the request signals.

It should be understood that alternative embodiments of using counters or other criteria may be used by the state machine 145. For example, the state machine 145 may use other process flows, non-counter variables, or other standard or non-standard techniques for determining a detection. Further, rather than receiving the output from the hypothesis detector 140, the input to the state machine 145 may be raw data from the heartbeat channel processor 112 or request channel processor 114. Further, in an alternative embodiment, the state machine 145 may be included in combination with the hypothesis detector 140.

Referring again to FIG. 2A, in addition to using the state machine 145 to ascertain with high probability whether the field unit 42a is making a 'request to go active', the hypothesis detector 140 is also employed.

To determine which signal(s) is/are present, the hypothesis detector 140 includes logical functions. For example, in this particular embodiment, the hypothesis detector 140 compares a first energy level threshold against the first energy level (i.e., heartbeat energy level) and compares a second energy level threshold against the second energy level (i.e., request energy level).

Example energy level thresholds against which to compare the heartbeat energy level and the request energy level are 9 dB and 11 dB, respectively. The energy level thresholds may be dynamically selected, predetermined, or applied in another manner, such as based on a transmitted power level, which may be reported by the field unit to the base station over the heartbeat standby channel 55HS, for instance. In the case of the energy level calculation and comparison, the first and second energy levels may be dependent on occupancy of time slots in the signaling channel(s) used by the signal 55, so the energy level thresholds can be based on an expected or specified number of "I" bits used to indicate a 'request to go active' or to indicate a request to remain in idle mode. Use of the energy level thresholds is discussed in related U.S. patent application entitled "Transmittal of Heartbeat Signal at a Lower Than Heartbeat Request," by Proctor, J., filed concurrently herewith, the entire teachings of which are incorporated herein by reference.

As discussed above, the output of the hypothesis detector 140 is measured by the state machine 145 determine whether to change the state of the communications system, which is the state of reverse link traffic channels between the field unit 42a and the base station 25. For example, if the hypothesis detector 140 determines that a 'request to go active' (i.e., send a data transmission on the reverse link) is being made by the field unit 42a, then the state machine 145 outputs a signal to a processor (not shown) in the BTS 25 that is responsible for providing the portable computer 12 with a traffic channel 55T. In one particular embodiment, the BTS 25 allocates the traffic channel 55T if the number of consecutive request signals is determined to be two or more consecutively. Alternative criteria have been discussed above.

As described in reference to FIG. 3C, the heartbeat channel processor 112, request channel processor 114, and hypothesis detector 140 may be configured or designed in a manner that monitors an occupancy of time slots used to indicate the request to change communications states. In one embodiment, the detecting includes monitoring occupancy of mutually exclusive code channels, such as shown in FIGS. 3B and 3C.

A feedback loop (not shown) may be employed to cause the heartbeat channel processor 112 and request channel processor 114 to be "adaptive". For example, based on the received energy level of the heartbeat channel 55H, the integration time of the integrators 125, 135 may be adjusted, and the energy level thresholds used by the hypothesis detector 140 for comparison of the energy levels of the heartbeat and request signals may also be adjusted by the feedback loop. Other feedback may cause (i) the number of consecutive pulses required for a detection to be increased or decreased or (ii) the number of transmitted request signals to be increased or decreased. Such a feedback loop may use a command or message to transfer information between the BTS 25 and field unit 42a that includes information regarding the pulse repetitions or power levels of the heartbeat and heartbeat-with-request signals transmitted by the field unit 42a.

As discussed above, the first communications state may be a standby state and the second communications state may be a payload state. In other systems or even the same system, the communications states may refer to other communications states, such as a request to change base stations, power control signaling, and so forth. The use of different signal repetitions or energy levels in signaling as described herein is applicable to wireless, wired, or optical communications systems. In either case, the communications states may be used in voice or data communications systems.

As also discussed above, the second energy level may be based on a target probability of detection, false detection, or combination of both as discussed in reference to FIG. 4. In other words, the field unit may transmit the request signal at a given power level or a given number of pulses per given time period to achieve a corresponding signal-to-noise ratio for a given target probability of detection, false detection, or both as discussed in reference to FIG. 4.

An analysis may be used to set the transmission power or number of transmitted indications, or the feedback mechanism discussed above may be employed in the communications system for causing the field unit to change its behavior so as to have the received energy levels of the indications achieve a predetermined signal-to-noise ratio, thus providing the desired probability of detection and false detection parameters.

Simulation

A simulation for a reverse link was conducted where the reverse link is assumed to have power control and a heartbeat channel of any of the example types shown in FIGS. 3A-3C or another type of communications link signaling.

First, there are two assumptions that have been made for this simulation. First, power control is used on a combination of detected paths or in a single path. Power control is performed even when a positive detection is not achieved. Second, the probability of detection was set to achieve detection at a high enough rate to ensure that power control is performed on the correct signal. To clarify, detection is required to track the received signal.

Table 1 shows the rate of detection required for a single path channel from a vehicle moving away from the base station at 60 mph. This table requires that there is at least one detection per slew of a chip due to movement.

TABLE 1

| | |
|---|---|
| Slew Distance for 1 chip | 814 ft |
| Handset Velocity | 60 mph |
| Handset Velocity | 88 ft/s |
| Chip Slew Rate | 9.2 chips/s |
| Heartbeat Rate | 50 HB/s |
| Heartbeats/Td | 462 |

In Table 1, the time period Td is defined as the period over which a single heartbeat pulse must be detected to ensure the signal is tracked as the time of arrival of the signal is skewed due to movement of the vehicle. Table 1 shows that one out of every 462 pulses must be received with a very high probability or there is a risk of losing the tracking of the signal.

Based on this calculation, the threshold of detection was set from a table of detection/false detection probabilities (e.g., FIG. 4). While Table 1 is defined for Additive White Gaussian Noise (AWGN), it is expected that the probabilities of detection are not greatly affected over a relatively short amount of time. This is due to the statistical independence of the fading from heartbeat pulse to heartbeat pulse.

While the individual pulse probabilities of detection varied significantly, the overall results were not seen to vary significantly by more than a factor of roughly 50% in the latency of detection. Specifically, the average detection latency for the request message in AWGN was 11 ms as compared to roughly 15 ms for 30 km/hr. Again, this result is due to requiring a detection process rather than a more difficult demodulation process.

Based on this analysis, a probability of detection of 20% and false detection of 1% was selected. This requires an average Eb/No of 3 dB. This is shown and discussed in reference to FIG. 4.

Table 2 shows a calculation of the probability of detection and false detection during the time Td defined above.

TABLE 2

| | |
|---|---|
| Target E/Io (entire energy/interference density) | 3 dB |
| Probability of detection | 0.2 |
| Probability of false detection | 0.01 |
| Probability of detection for 3 Sequential HB | 8.00E−03 |
| Number of trials in Td | 462 |
| Probability of no detection in Td | 2.44E−02 |
| Probability of false detection for 3 sequential | 1.00E−06 |
| Required no false detection trials | 462 |
| Probability of false detection for Td | 4.62E−04 |

To reduce the probability of false detection, three sequential detections were required to validate a single detection. Since the probability of false detections is multiplicative in this case, the probability of a single false detection is cubed.

Table 3 below calculates the average Echo (energy-per-chip per the interference density, which is the SNR integrated over the entire chip) required to achieve the statistics of Table 2.

TABLE 3

| | |
|---|---|
| Target E/Io | 3 dB |
| Processing Gain | 256 |
| Burst Ec/Io | −21.08 dB |
| Average Ec/Io | −40.9 dB |

Since the heartbeat channel is time division multiplexed (TDM) in structure, the interference to all other users due to heartbeat users increases as follows:

Effective average Echo (all HB users)=10*log 10(N)−40.9, where N is the number of users.

Thus, for 96 users of a given base station, the average total interference will equal the burst Echo or −21.08 dB.

While this invention has been particularly shown and described with references to preferred embodiments thereof, it will be understood by those skilled in the art that various changes in form and details may be made therein without departing from the scope of the invention encompassed by the appended claims.

What is claimed is:

1. A wireless transmit receive unit (WTRU) comprising:
a receiver configured to receive at least one signal having a first indication of a first communications state, and a second indication for a request to change to a second communications state;
wherein the first indication has a first energy level and further wherein the second indication has a second energy level;
at least one monitor configured to monitor at least one first time slot for detecting the first indication, and at least one second time slot for detecting the second indication;
a counter coupled to the at least one monitor configured to count at least one of the detected first or second indications; and
a processor coupled to the counter configured to determine whether a request to change communications states has been performed based on the counting and based further on a difference in energy levels of the first and second indications.

2. The WTRU of claim 1 wherein the processor is further configured to compare a number of counted detected second indications against a threshold of at least two detected second indications.

3. The WTRU of claim 1 wherein the counter is further configured to reset if non-consecutively detected first indications or non-consecutively detected second indications are received in the at least one signal.

4. The WTRU of claim 3 wherein the counter is further configured to reset if the threshold of at least two detected second indications is not achieved in a given time span.

5. The WTRU of claim 1 wherein the at least one monitor is configured to measure the at least one signal in the at least one first and second time slots, and to compare results thereof to first and second thresholds for detecting the first and second indications.

6. The WTRU of claim 1 wherein the first and second time slots are not shared in time and do not overlap and when a when a heartbeat signal of the WTRU is at a logical zero.

7. A method for use in a wireless transmit receive unit (WTRU), the method comprising:
receiving at least one signal having a first indication of a first communications state, and a second indication for a request to change to a second communications state;
wherein the first indication has a first energy level and further wherein the second indication has a second energy level;
monitoring at least one first time slot for detecting the first indication, and at least one second time slot for detecting the second indication;
counting, via a counter, at least one of the detected first or second indications and storing a count; and
determining, via a processor coupled to the counter, whether a request to change communications states has been performed based on the counting and based further on a difference in energy levels of the first and second indications.

8. The method of claim 7 further comprising:
comparing a number of counted detected second indications against a threshold of at least two detected second indications.

9. The method of claim 7 further comprising:
resetting the count if non-consecutively detected first indications or non-consecutively detected second indications are received in the at least one signal.

10. The method of claim 9 further comprising:
resetting the count if the threshold of at least two detected second indications is not achieved in a given time span.

11. The method of claim 7 further comprising:
measuring the at least one signal in the at least one first and second time slots; and
comparing results thereof to first and second thresholds for detecting the first and second indications.

12. The method of claim 7 wherein the first and second time slots are not shared in time and do not overlap and when a when a heartbeat signal of the WTRU is at a logical zero.

13. The method of claim 7, further comprising:
determining at a base station whether the WTRU is making a request to go active.

14. The method of claim 13, wherein determining the WTRU is making the request to go active is based upon a measurement comprising one or more of counting a number of consecutive request signals, measuring a ratio of heartbeat standby channel signals and heartbeat request active channel signals, counting heartbeat request active signals in a given time span, and comparing a difference in the energy levels against a threshold.

15. The method of claim 14, wherein the threshold is based on an expected or specified number of "1" bits used to indicate a request to go active or an expected or specified number of "1" bits used to indicate a request to remain in idle mode.

16. The method of claim 13, wherein determining the WTRU is making the request to go active is based on the counter exceeding a threshold, wherein a state machine at the base station reports a detection of a request to go active from the WTRU when the counter exceeds the threshold and wherein the state machine waits to receive further data when the counter does not exceed the threshold.

17. The method of claim 13, wherein determining the WTRU is making the request to go active is based on how many indications of a request to go active have been received according to specified criteria comprising any one of: a number of consecutive detections of a request to go active, a number of detections of a request to go active in a specified time span, and a ratio of detections of a request to go active to non-detections of a request to go active.

18. The method of claim 7, wherein the difference in energy levels of the first and second indications is based on a transmitted power level as reported by the WTRU to a base station over a heartbeat standby channel.

19. The method of claim 18, wherein an energy level calculation and comparison is performed to determine the difference in energy levels of the first and second indications, wherein the first and second energy levels is dependent on occupancy of time slots in signaling channels used by the at least one signal.

* * * * *